US012566835B2

(12) United States Patent
Byington et al.

(10) Patent No.: US 12,566,835 B2
(45) Date of Patent: Mar. 3, 2026

(54) QUICK RESPONSE CODES FOR DATA TRANSFER

(71) Applicant: Apple Inc., Cupertino, CA (US)

(72) Inventors: Matthew C. Byington, Sunnyvale, CA (US); Anton K. Diederich, Mountain View, CA (US); Jenna Yi, San Jose, CA (US); Luojie Xiang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 446 days.

(21) Appl. No.: 17/951,063

(22) Filed: Sep. 22, 2022

(65) Prior Publication Data

US 2023/0101005 A1    Mar. 30, 2023

Related U.S. Application Data

(60) Provisional application No. 63/248,397, filed on Sep. 24, 2021, provisional application No. 63/248,384, filed on Sep. 24, 2021.

(51) Int. Cl.
*G06F 21/36*        (2013.01)
*G06F 21/60*        (2013.01)
*G06F 21/64*        (2013.01)
*G06F 21/10*        (2013.01)

(52) U.S. Cl.
CPC ............ *G06F 21/36* (2013.01); *G06F 21/602* (2013.01); *G06F 21/604* (2013.01); *G06F 21/64* (2013.01); *G06F 21/107* (2023.08)

(58) Field of Classification Search
CPC ...... G06F 21/602; G06F 21/64; G06F 21/604; G06F 21/36; G06F 21/107
See application file for complete search history.

(56) References Cited

U.S. PATENT DOCUMENTS

| | | | |
|---|---|---|---|
| 8,924,726 B1 * | 12/2014 | Hodgman | ................ G09C 5/00 380/243 |
| 9,552,693 B1 * | 1/2017 | Reeves | ............... G07F 17/3239 |
| 9,923,904 B1 | 3/2018 | Saylor et al. | |
| 10,187,362 B1 | 1/2019 | Mcclintock et al. | |
| 10,489,815 B1 * | 11/2019 | Desai | ................. G06Q 30/0226 |

(Continued)

FOREIGN PATENT DOCUMENTS

| | | |
|---|---|---|
| CN | 110363520 A | 10/2019 |
| CN | 110383869 A | 10/2019 |

(Continued)

OTHER PUBLICATIONS

I. Tkachenko, W. Puech, C. Destruel, O. Strauss, J. -M. Gaudin and C. Guichard, "Two-Level QR Code for Private Message Sharing and Document Authentication," in IEEE Transactions on Information Forensics and Security, vol. 11, No. 3, pp. 571-583, Mar. 2016. (Year: 2016).*

(Continued)

*Primary Examiner* — Kari L Schmidt
(74) *Attorney, Agent, or Firm* — Kilpatrick Townsend & Stockton LLP

(57) ABSTRACT

The present application relates to devices and components including apparatus, systems, methods, and computer-readable medium to utilize quick response (QR) codes for performing a data transfer between accounts. Embodiments may provide protection from improper use of the QR codes.

17 Claims, 25 Drawing Sheets

(56) References Cited

U.S. PATENT DOCUMENTS

| | | | | |
|---|---|---|---|---|
| 11,030,299 | B1 * | 6/2021 | Ilincic | G06F 21/45 |
| 11,176,240 | B1 * | 11/2021 | Miles | G06F 21/6218 |
| 11,277,520 | B1 * | 3/2022 | Nguyen | H04M 3/42178 |
| 11,314,998 | B1 * | 4/2022 | Sanderson | G06Q 20/3274 |
| 11,367,060 | B1 * | 6/2022 | Barbashin | H04N 21/2743 |
| 12,380,196 | B2 | 8/2025 | Byington et al. | |
| 2014/0359294 | A1 | 12/2014 | Armitage | |
| 2015/0041530 | A1 * | 2/2015 | Burkhart | G06K 7/1404 |
| | | | | 235/494 |
| 2015/0244715 | A1 | 8/2015 | Narayan et al. | |
| 2015/0317597 | A1 * | 11/2015 | Shucker | G06Q 10/0833 |
| | | | | 235/375 |
| 2017/0019396 | A1 | 1/2017 | Bettenburg et al. | |
| 2019/0034621 | A1 | 1/2019 | Mondello et al. | |
| 2019/0121997 | A1 * | 4/2019 | Levin | H04L 63/04 |
| 2019/0172047 | A1 | 6/2019 | Tan et al. | |
| 2019/0205865 | A1 * | 7/2019 | Jamkhedkar | G06Q 20/382 |
| 2020/0074356 | A1 * | 3/2020 | Tseng | G06Q 20/045 |
| 2020/0092272 | A1 * | 3/2020 | Eisen | H04L 63/0869 |
| 2020/0143131 | A1 * | 5/2020 | Fan | G06K 19/06037 |
| 2020/0193722 | A1 * | 6/2020 | Moran | G06Q 20/401 |
| 2020/0351660 | A1 | 11/2020 | Avetisov et al. | |
| 2021/0209582 | A1 | 7/2021 | Paliwal et al. | |
| 2021/0377309 | A1 | 12/2021 | Jogand-Coulomb et al. | |
| 2021/0392054 | A1 * | 12/2021 | David | H04L 67/56 |
| 2022/0044506 | A1 * | 2/2022 | Dewey | G07C 9/215 |
| 2022/0122072 | A1 * | 4/2022 | Kang | G06Q 20/4014 |
| 2022/0147970 | A1 * | 5/2022 | Babcock | G06Q 20/4016 |
| 2022/0381651 | A1 * | 12/2022 | Gorgievski | G06K 7/10722 |
| 2022/0391877 | A1 | 12/2022 | Becerra Morales et al. | |
| 2023/0179592 | A1 | 6/2023 | Colesanto et al. | |
| 2023/0206267 | A1 * | 6/2023 | Doumar | G06Q 30/0207 |

FOREIGN PATENT DOCUMENTS

| | | |
|---|---|---|
| CN | 111539237 A | 8/2020 |
| CN | 111835936 A | 10/2020 |

OTHER PUBLICATIONS

Lorenzi, David, et al. "Using QR codes for enhancing the scope of digital government services." Proceedings of the 13th Annual International Conference on Digital Government Research. 2012, pp. 21-29. (Year: 2012).*

H. A. M. Wahsheh and M. S. Al-Zahrani, "Secure and Usable QR Codes for Healthcare Systems: The Case of Covid-19 Pandemic," 2021 12th International Conference on Information and Communication Systems (ICICS), Valencia, Spain, 2021, pp. 324-329. (Year: 2021).*

QR Code How to Password Protected QR Codes, Available online at: https://www.qrstuff.com/blog/qr-code-how-to/password-protected-qr-codes, Oct. 31, 2011, 5 pages.

Secure Password Protected QR Codes, Available online at: https://www.labelingnews.com/2012/07/secure-password-protected-qr-codes/, Jul. 20, 2012, 4 pages.

U.S. Appl. No. 17/951,023, Non-Final Office Action, Mailed on Nov. 22, 2024, 40 pages.

U.S. Appl. No. 17/951,057, Notice of Allowance, Mailed on Nov. 21, 2024, 9 pages.

China Patent Application No. 202211163566.7, Office Action, Jun. 27, 2025, 11 pages.

Final Office Action issued U.S. Appl. No. 17/951,023, dated Sep. 5, 2025 in 47 pages.

* cited by examiner 100
108 — QR Provision Device
110 — QR Code Generator
102
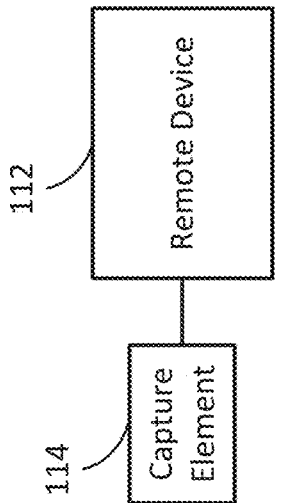
104
106 — Information collection in progress
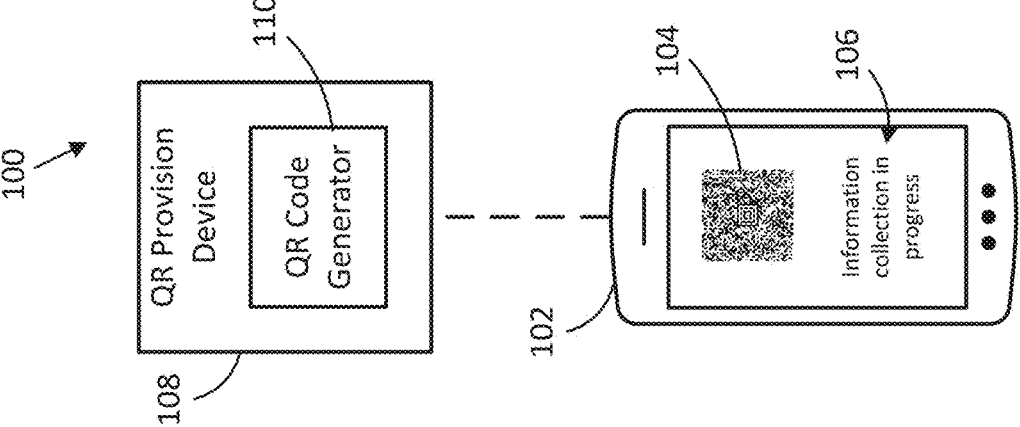
112 — Remote Device
114 — Capture Element
FIG. 1

1500

1502 — Determine that QR Codes have been Stored for longer than a Time Threshold 1504 — Remove the QR Codes 1506 — Determine that a Number of QR Codes is less than a Threshold 1508 — Determine that the Device does not have Connectivity 1510 — Maintain Storage of the QR Codes 1512 — Request a Plurality of QR Codes 1514 — Indicate an Amount of QR Codes 1516 — Receive the Plurality of QR Codes 1518 — Receive a Request to Display a QR Code 1520 — Perform an Authorization Operation

1522 — A

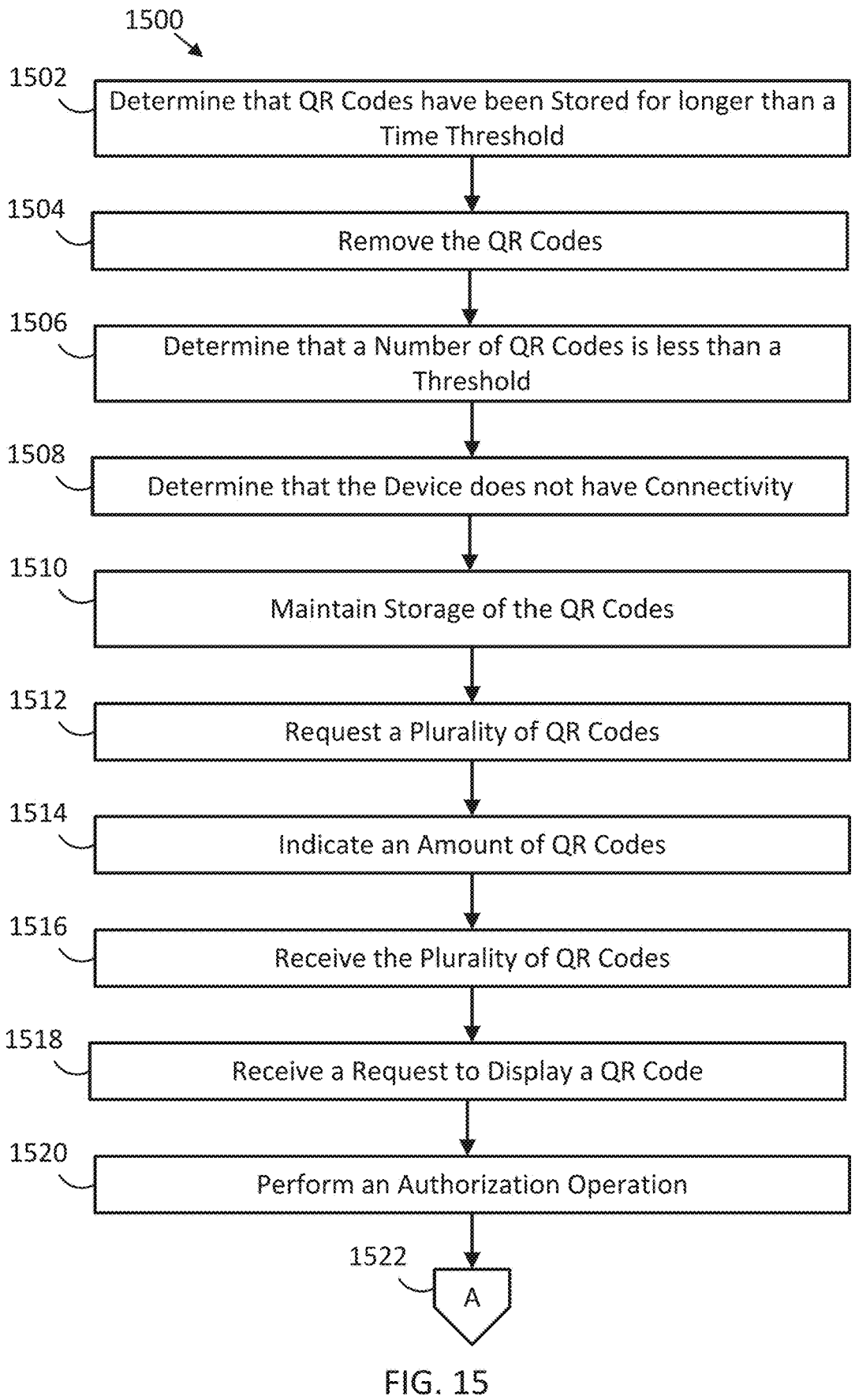

1702 — | Determine a Number of QR Codes is less than a Threshold Number |

1704 — | Provide a Request |

1706 — | Indicate a Number of Additional QR Codes |

1708 — | Determine a Portion of QR Codes have been Stored for longer than a Time Threshold |

1710 — | Remove the Portion of QR Codes |

1712 — | Receive an Authorization Request |

1714 — | Perform an Authorization Operation |

1716 — | Decrypt QR Code |

1718 — | Display Decrypted QR |

1720 — B

1700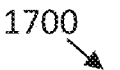
1720
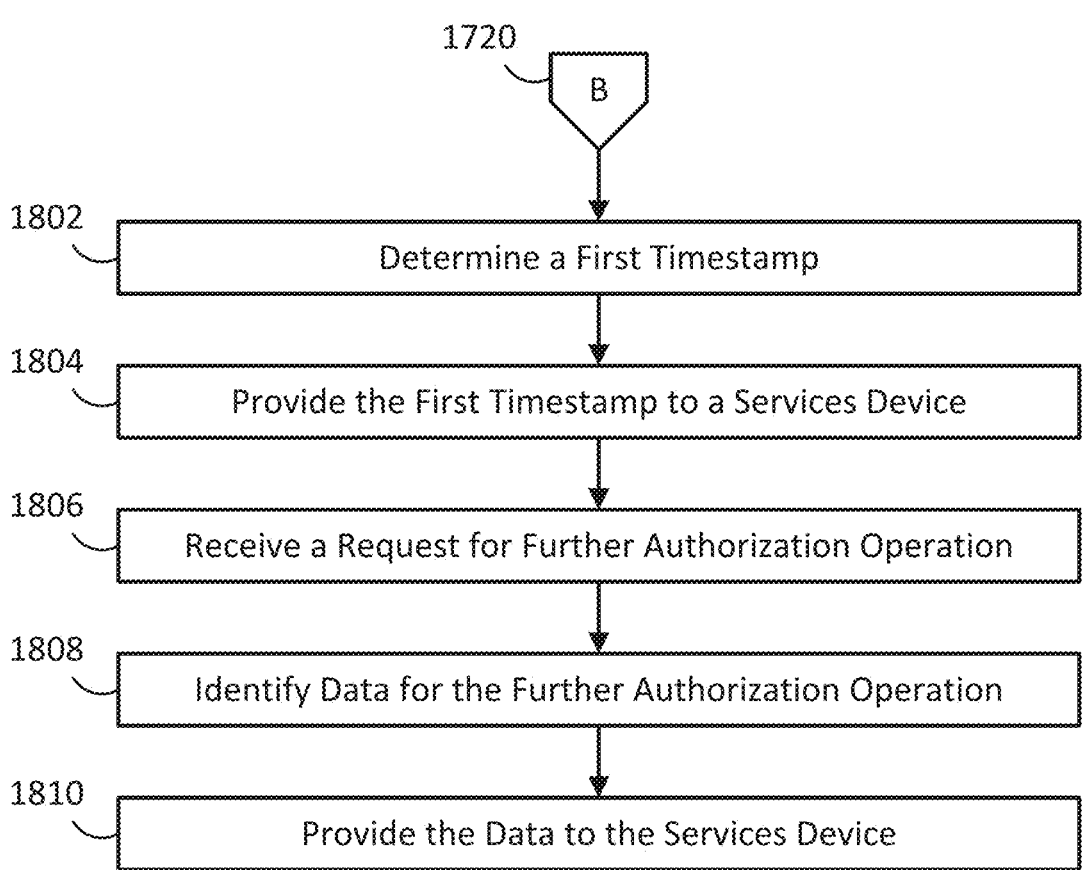
1802   Determine a First Timestamp
1804   Provide the First Timestamp to a Services Device
1806   Receive a Request for Further Authorization Operation
1808   Identify Data for the Further Authorization Operation
1810   Provide the Data to the Services Device
FIG. 18

1900

1902 — Receive a Request to Display a QR Code

1904 — Perform an Authorization Operation

1906 — Decrypt the QR Code

1908 — Display the QR Code

1910 — Prevent the QR Code from being Displayed a Second Time

1912 — Determine that a Number of Valid QR Codes is less than a Threshold Number 1914 — Request Additional QR Codes 1916 — Determine that QR Codes have been Stored for longer than a Time Threshold 1918 — Remove the QR Codes from Storage

FIG. 19

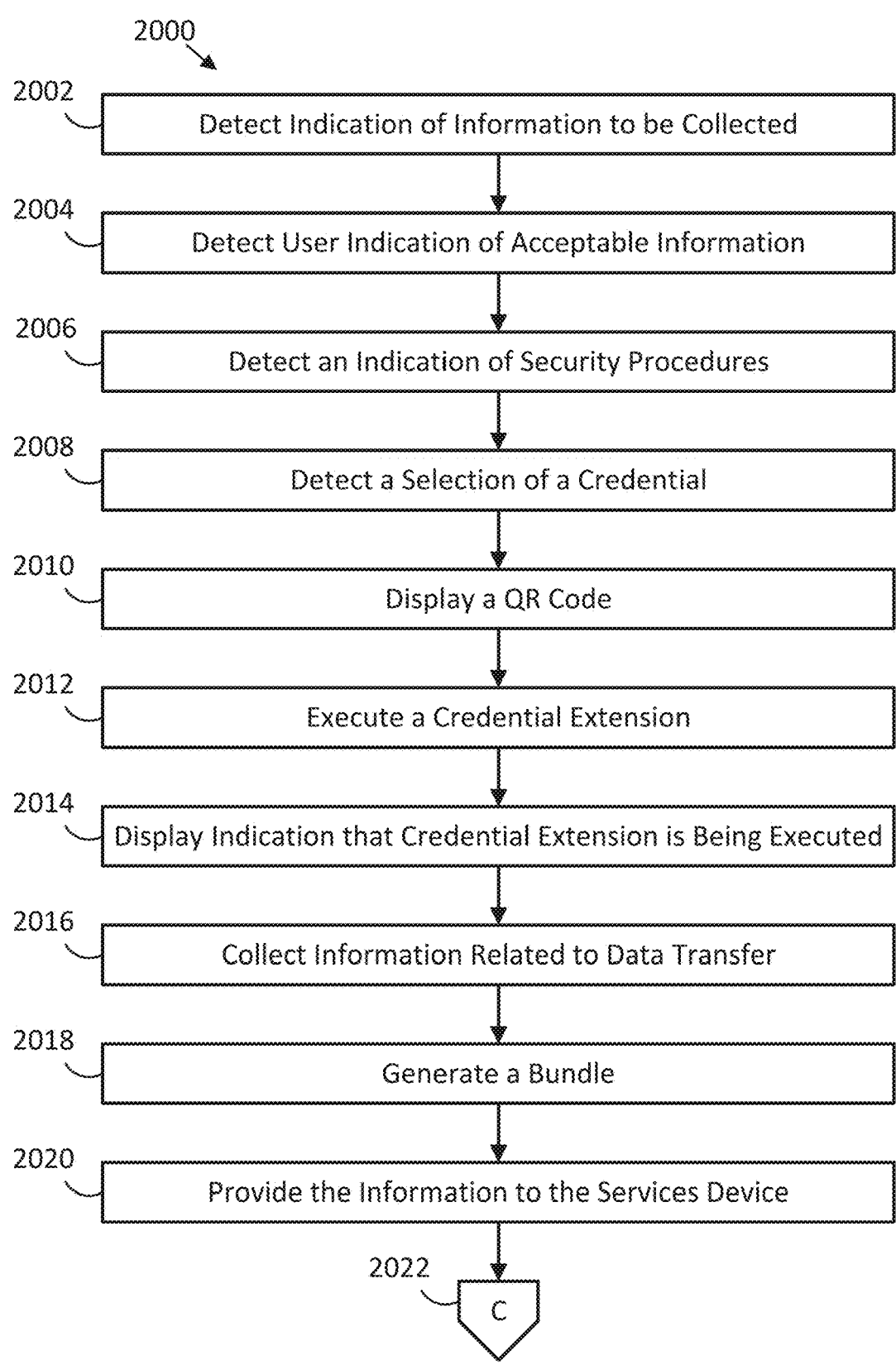

2000

2002   Detect Indication of Information to be Collected

2004   Detect User Indication of Acceptable Information

2006   Detect an Indication of Security Procedures

2008   Detect a Selection of a Credential

2010   Display a QR Code

2012   Execute a Credential Extension

2014   Display Indication that Credential Extension is Being Executed

2016   Collect Information Related to Data Transfer

2018   Generate a Bundle

2020   Provide the Information to the Services Device

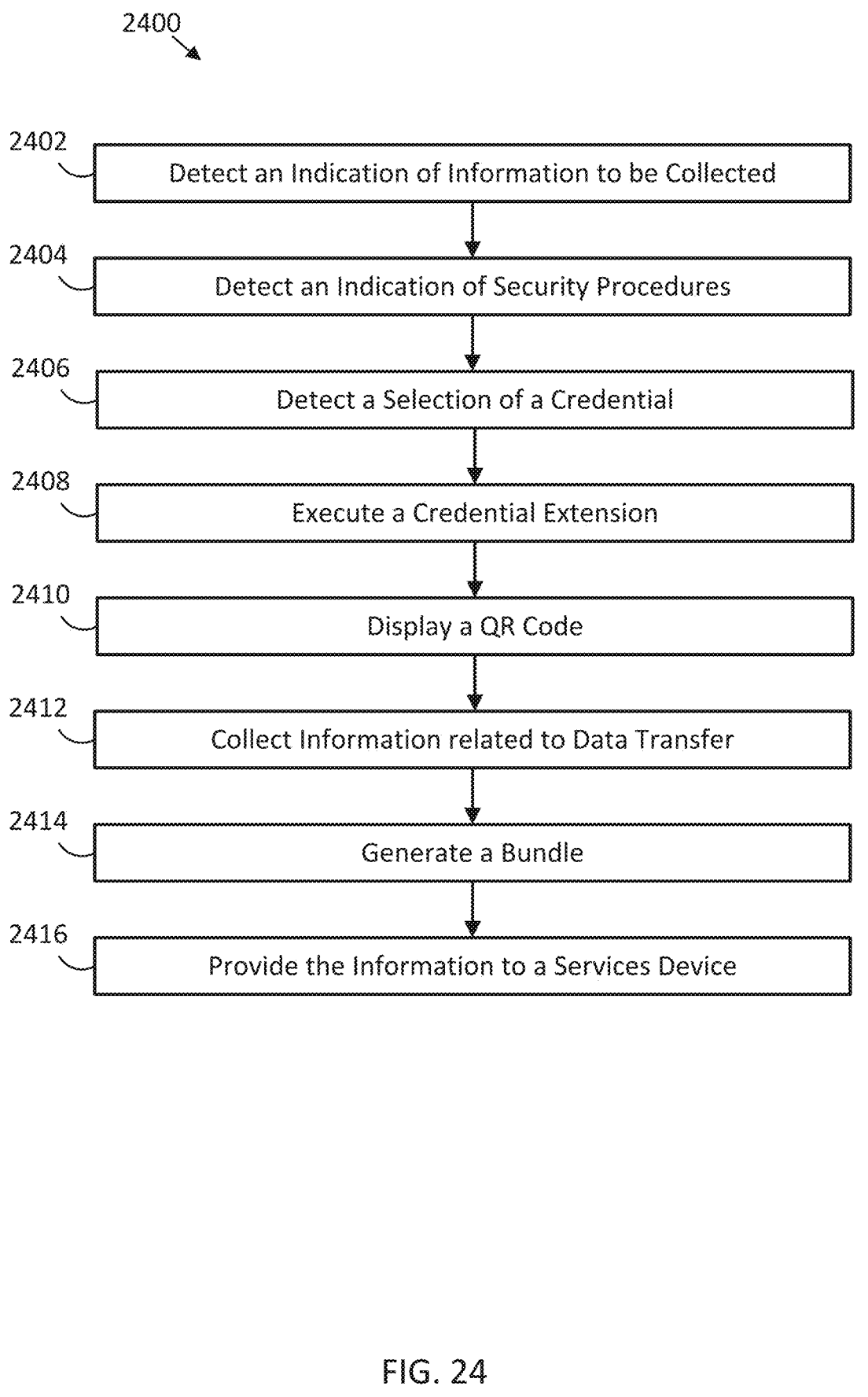

2402 — Detect an Indication of Information to be Collected

2404 — Detect an Indication of Security Procedures

2406 — Detect a Selection of a Credential

2408 — Execute a Credential Extension

2410 — Display a QR Code

2412 — Collect Information related to Data Transfer

2414 — Generate a Bundle

2416 — Provide the Information to a Services Device

FIG. 24

QUICK RESPONSE CODES FOR DATA TRANSFER

CROSS-REFERENCE TO RELATED APPLICATIONS

This application claims priority to U.S. provisional application No. 63/248,384, entitled "QUICK RESPONSE CODES FOR DATA TRANSFER," filed on Sep. 24, 2021, and U.S. provisional application No. 63/248,397, entitled "CREDENTIAL EXTENSION FOR DATA TRANSFER", filed on Sep. 24, 2021. This application is also related to U.S. nonprovisional application Ser. No. 17/951,057, entitled "QUICK RESPONSE CODES FOR DATA TRANSFER," filed on Sep. 22, 2022, and U.S. nonprovisional application Ser. No. 17/951,023, entitled "CREDENTIAL EXTENSION FOR DATA TRANSFER," filed concurrently herewith on Sep. 22, 2022. The disclosure of all these applications, both provisional and non-provisional, are incorporated by reference herein in their entireties for all purposes.

BACKGROUND

The development and advancement of wireless communication has led to the utilization of wireless communication for performing many tasks. One such task for which wireless communication has been utilized is the performance of data transfer among accounts. In instances, near field communication is utilized for communication between devices to perform data transfer between accounts associated with devices. However, near field communication may not be available and/or appropriate in certain situations.

BRIEF DESCRIPTION OF THE DRAWINGS

FIG. 1 illustrates a portion of an example system arrangement according to some embodiments.

FIG. 15 illustrates a first portion of an example procedure for display of a QR code for a data transfer in accordance with some embodiments.

FIG. 18 illustrates a second portion of the example procedure of FIG. 17 for display of a QR code for a data transfer in accordance with some embodiments.

FIG. 19 illustrates an example procedure for display of a QR code for a data transfer in accordance with some embodiments.

FIG. 20 illustrates a first portion of an example procedure for execution of a credential extension on a device to collect information in accordance with some embodiments.

FIG. 24 illustrates another example procedure for execution of a credential extension on a device to collect information in accordance with some embodiments.

DETAILED DESCRIPTION

Figure 2:
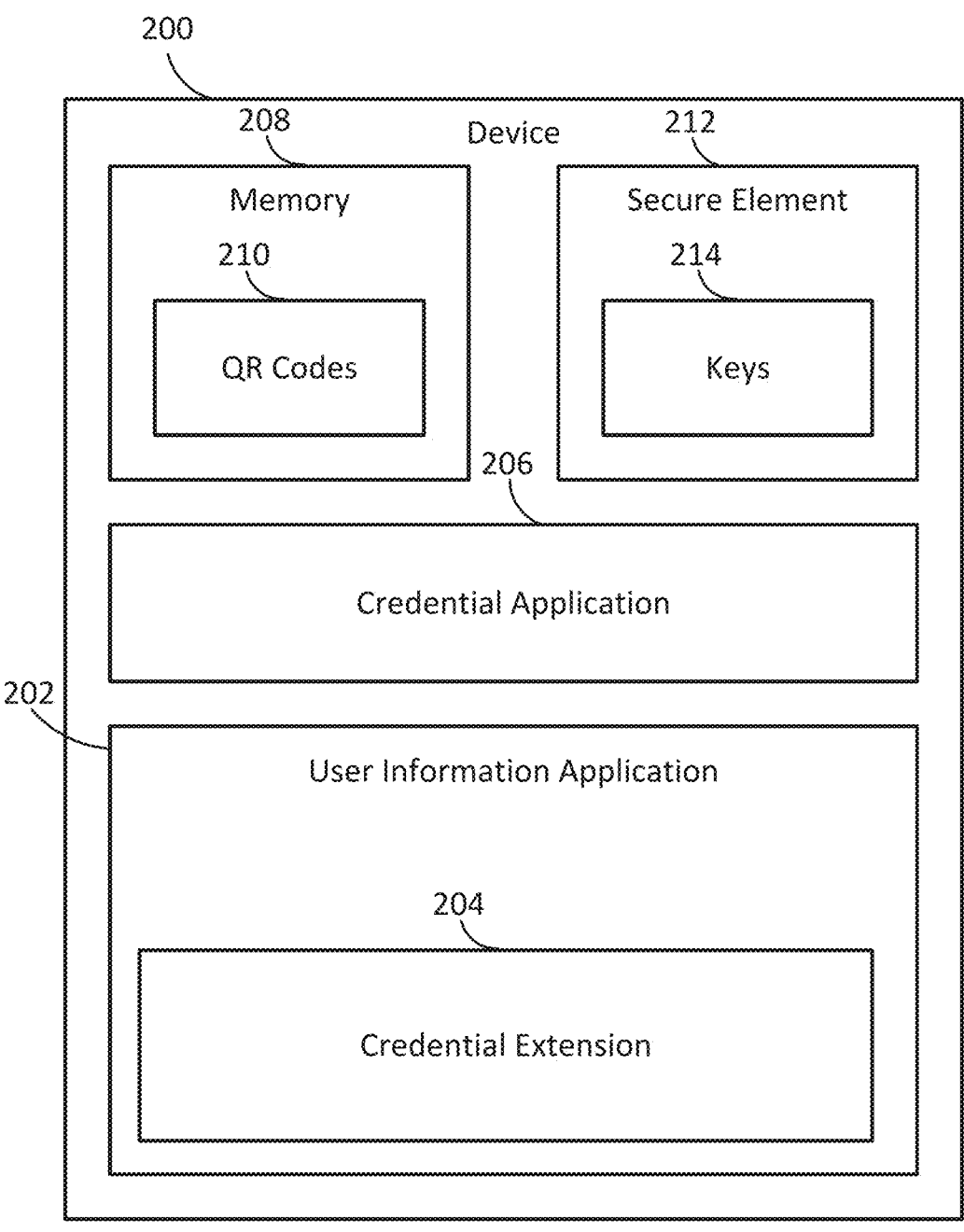
FIG. 2 illustrates an example device in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Embodiments described herein may include utilization of quick response (QR) codes for performing data transfers and/or processing between and/or by devices. For example, a QR provision device may generate one-time use QR codes to be utilized for data transfer between an account associated with a first device and a second device. The QR provision device may provide the one-time use QR codes to the first device, which can store the QR codes for future use.

To initiate a data transfer, a user of the first device may select a credential associated with the QR codes, which requests that one of the QR codes be displayed on the display of the device. The first device may retrieve one of the QR codes from memory and display the QR code on the display of the first device in response to the selection of the credential.

A user of the second device may utilize a capture element of the second device to scan the QR code presented on the first device. The first device and the second device may communicate with one or more servers and/or other devices that maintain accounts associated with the devices. Based on the second device scanning the QR code displayed on the first device, the servers and/or other devices may determine whether the devices are authorized to perform the data transfer. If the servers and/or other devices determine that the first device and the second device are authorized to perform the data transfer, the servers and/or other devices may perform a data transfer between the accounts associated with the first device and the second device, which may result in the values within the accounts being changed.

Embodiments described herein may include a first device with a user information application for managing credentials on the device. An extension may operate within the user information application. The extension may communicate with a service device, where the service device may communicate information to be gathered by the extension for determining authorization for a data transfer between the first device and the second device. The extension may further encrypt the gathered information before being transmitted from the device to prevent bad actors and/or entities within the system from accessing the information.

Embodiments described herein may further provide protection for the QR codes to protect from bad actors utilizing the QR codes to perform unauthorized data transfers. For example, each of the QR codes may be individually encrypted such that the first device is able to decrypt a single QR code at a time for use. The QR codes may further be single-use QR codes where the device is limited to display each QR code once. The QR codes may also become stale when remaining on the device for too long or may be invalid if a QR code is attempted to be utilized past a threshold amount of time since the QR code was first displayed on the first device. As the QR codes are used and/or invalidated, the first device may retrieve additional QR codes from a services device to be utilized for initiating a QR code.

FIG. 1 illustrates a portion of an example system arrangement 100 according to some embodiments. For example, the system arrangement 100 may illustrate a portion of a system that can utilize QR codes for performing data transfers. It should be understood that the system arrangement 100 may illustrate a portion of a system, where the system may include one or more elements described throughout this disclosure.

Figure 25:
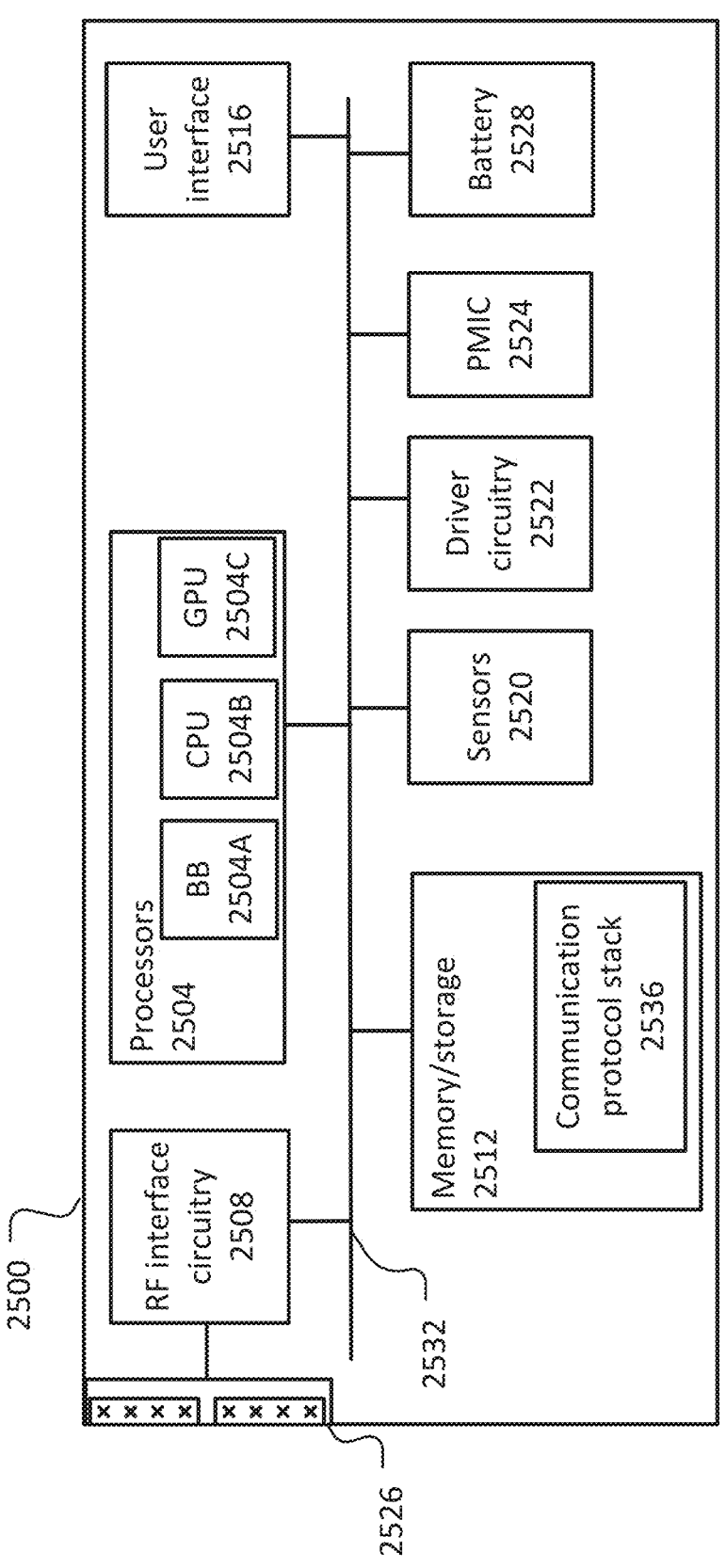
FIG. 25 illustrates an example user equipment (UE) in accordance with some embodiments.

The example system arrangement 100 may include a device 102. The device 102 may include one or more of the features of the UE 2500 (FIG. 25). The device 102 may execute a user information application. The user information application may manage one or more credentials associated with a user of the device 102. Each of the credentials may be associated with an account related to a user of the device 102, where the account may store data for the user. A user of the device 102 may be able to select among the credentials stored on the device 102 to perform a data transfer with data associated with a selected credential.

One or more of the credentials stored on the device 102 may utilize QR codes for initiation of data transfer. For example, the device 102 may have one or more encrypted QR codes associated with one or more of the credentials stored on the device 102. The device 102 may perform biometric authentication (such as facial and/or fingerprint recognition) to authenticate the user. If the user is properly authenticated, the device 102 may retrieve one of the encrypted QR codes and decrypt the QR code for display. In some embodiments, the encrypted QR codes may have been individually encrypted and the device 102 may be capable of decoding a single QR code at a time based on the QR codes being individually encrypted. For example, each of the encrypted QR codes may be encrypted with separate keys, where a single biometric authentication of the user may provide access to a single key. Accordingly, the device 102 may retrieve a corresponding encrypted QR code and key based on the biometric authentication and may decrypt the single QR code. The device 102 may display the decrypted QR code 104 on a display of the device 102, where the QR code 104 may be scanned by another device for initiation of a data transfer.

In some embodiments, the QR code 104 may be a single-use QR code that may be utilized for a single data transfer. In some embodiments, the device 102 may remove the QR code 104 from storage or store an indication with the QR code 104 once the QR code 104 has been displayed to prevent the QR code 104 from being displayed a second time. Further, a services device (as described further throughout the disclosure) utilized in the performance of the data transfer may verify that the QR code 104 has only been utilized for a single data transfer before starting a data transfer in some embodiments. The services device may prevent any data transfers where the services device determines that the QR code 104 has been utilized more than once.

In some embodiments, the QR code 104 may be valid for certain period of time after the initial display of the QR code 104 on the display of the device 102. In some of these embodiments, the device 102 may determine that the certain period of time has elapsed since the initial display of the QR code 104 on the display and cause the QR code 104 to be removed the display based on the certain period of time having elapsed. Further, the device 102 may capture a timestamp corresponding to the initial display of the QR code 104 on the display of the device 102 in some embodiments. The device 102 may provide the timestamp to the services device, where the services device may compare the timestamp with another timestamp corresponding to a time that the QR code 104 had been scanned by another device to determine if the QR code 104 was used within the certain period of time. If the services device determines that the QR code 104 was not used within the certain period of time, the services device may prevent the corresponding data transfer from being performed.

In some embodiments, the QR code 104 being displayed may be displayed in a manner that cannot be copied by traditional image capture devices (such as cameras). For example, the QR code 104 displayed may be an artistic representation of the QR code 104. The artistic representation of the QR code 104 may have the QR code 104 being obscured by additional dots and/or images within the artistic representation. Devices intended to read the QR code 104 may be provided with information that allows the devices to decipher the QR code 104 from the additional dots and/or images. In contrast, devices without the provided information may not be capable of deciphering the QR code 104 from the additional dots and/or images.

In some embodiments, the device 102 may gather information related to the display of the QR code 104. In some of these embodiments, an extension may be executed within the user information application on the device 102. The extension may be an application programming interface (API) executed within the user information application. The extension may be associated with the services device that is to facilitate the data transfer. The extension may be sandboxed within the user information application, where the sandboxing limits the data that the extension may gather and/or operations that the extension may perform. The extension may gather information related to the display of the QR code 104 and may provide the gathered information to the services device. The information gathered by the extension may be limited by the sandboxing and/or settings that can be set by a user of the device as to the information that can be shared by the device. The services device may provide one or more indications of information to be gathered by the extension, which the services device may utilize to determine if the user and/or device are authorized to perform the data transfer. In some embodiments, the device 102 may display an indication 106 that information is being gathered on a display of the device 102. For example, the device 102 may display the indication 106 while the QR code 104 is being displayed on the device 102 in some embodiments.

In some embodiments, the device 102 may further be prevented from taking screenshots and/or performing screen recording of the QR code 104. For example, the device 102 may prevent a user of the device 102 and/or an application on the device from performing screenshots and/or screen recordings while the QR code 104 is being displayed. In other examples, the user and/or an application on the device may be able to perform screenshots and/or screen recordings while the QR code 104, but the QR code 104 may be prevented from appearing in the screenshots and/or the screen recordings. In some of these embodiments, the extension within the user information application may prevent the QR code 104 from being captured in screenshots and/or screen recordings.

The system arrangement 100 may further include a QR provision device 108. In some embodiments, the QR provision device 108 may be implemented in the services device. The device 102 may be able to establish a wireless connection with the QR provision device 108 to retrieve QR codes from the QR provision device 108. The QR provision device 108 may include a QR code generator 110. The QR code generator 110 may generate QR codes (such as the QR code 104) for the device 102. In particular, the QR code generator 110 may generate QR codes associated with one or more accounts corresponding to the credentials stored within the user information application on the device 102. The QR code generator 110 may generate one or more QR codes in response to a request for additional QR codes received from the device 102.

The QR codes generated by the QR code generator 110 may be one-time use QR codes. For example, the QR codes generated by the QR code generator 110 may be intended to be used for a single data transfer by the device 102. Accordingly, the QR code generator 110 may generate a QR code for each data transfer performed by the device 102. The device 102 and/or the services device may verify that each of the QR codes is utilized for a single data transfer.

The QR code generator 110 may individually encrypt each of the QR codes generated by the QR code generator 110. Individually encrypting the QR codes may allow for a single QR code to be generated at a time. The QR code generator 110 may apply a proprietary encrypting to the QR code such that the device 102, or any other devices, are able to generate valid QR codes. In some embodiments, each of the QR codes may be encrypted by the QR code generator 110 via a corresponding unique key, where the QR provision device 108 may provision the QR codes and the corresponding keys to the device 102. The device 102 may then utilize a key provided by the QR provision device 108 to decrypt a corresponding encrypted QR code by the QR provision device 108. The device 102 may perform the authentication of the user, and retrieve the key and corresponding encrypted QR code based on the user being positively authenticated. Further, the QR code generator 110 may encrypt the QR codes uniquely to the device 102. For example, the QR code generator 110 may utilize information related to the device 102 to encrypt the QR codes, where the QR codes can be determined to be for the device 102 based on the encryption with the information.

The device 102 may request further keys based on a number of valid QR codes stored on the device 102. For example, the device 102 may request additional QR codes from the QR provision device 108 based on the number of valid QR codes stored on the device 102 being less than a threshold number of valid QR codes. The QR codes may become invalidated based on use and/or the QR code remaining stored on the device for a threshold time period without being used. For example, once a QR code has been displayed, the displayed QR code may be invalidated. Further, a QR code that remains stored on the device for a threshold period of time (such as 24 hours) may be invalidated. The device 102 may determine the number of valid QR codes stored on the device 102 and compare the number of valid QR codes to the threshold number of valid QR codes. If the device 102 determines that the number of valid QR codes stored on the device 102 is less than the threshold number of QR codes, the device 102 may request additional QR codes from the QR provision device 108.

In some embodiments where the device 102 determines that the number of valid QR codes stored on the device 102 is less than the threshold number of QR codes, the device 102 may further indicate a number of QR codes to be provided by the QR provision device 108. For example, the device 102 may be configured with a maximum number of QR codes to be stored on the device 102. The device 102 may determine the difference between the number of valid codes stored on the device 102 and the maximum number of QR codes to be stored on the device 102 and may request a number of QR codes from the QR provision device 108 to increase the number of stored valid QR codes on the device 102 to be maximum number of QR codes. Accordingly, the device 102 may indicate the difference between the maximum number of QR codes and the currently stored number of valid QR codes stored on the device when requesting additional QR codes from the QR provision device 108. In some embodiments, the maximum number of QR codes may be determined by the device 102 based on the usage of the QR codes by the device 102. For example, the device 102 may monitor the usage of the QR codes by a user of the device 102 and set the maximum number of QR codes to be equal to, or greater by a predetermined amount than, the number of QR codes that utilized by the user within the threshold period of time.

In some embodiments, the device 102 may determine if the device 102 can establish a connection with the QR provision device 108 before requesting additional QR codes from the QR provision device 108. If the device 102 determines that a connection can be established with the QR provision device 108, the device may delete the invalid QR codes from memory based on the device 102 requesting additional QR codes and/or the device 102 receiving additional QR codes from the QR provision device 108. If the device 102 determines that a connection cannot be established with the QR provision device 108 at the time, the device 102 may utilize a portion of the invalidated QR codes for initiating a data transfer. For example, the device 102 may determine to utilize the QR codes that have been invalidated based on being stored on the device 102 for longer than the threshold period of time. The device 102 may indicate, or the services device may determine, that the device 102 utilized invalidated QR codes for a data transfer, where the services device may determine whether to allow the data transfer based at least in part on whether the device 102 failed to retrieve additional QR codes. The device 102 may utilize these QR codes until the device 102 can establish a connection with the QR provision device 108 and retrieve additional QR codes from the QR provision device 108.

The system arrangement 100 may further include a remote device 112 with a capture element 114. In some embodiments, the remote device 112 may comprise a point of sale device. The remote device 112 may be associated with a second account that can be utilized for a data transfer. The capture element 114 may be a device that can read QR codes, such as the QR code 104 displayed on the device 102. For example, the capture element 114 may be a code scanner or camera that can capture QR codes, where the capture element 114 may be coupled to or included in the remote device 112.

To initiate a data transfer, the device 102 may display the QR code 104 and may be moved to a location where the capture element 114 can scan the QR code 104 displayed on the device 102. The remote device 112 may provide the QR code 104 and/or information related to the QR code 104 to the services device to initiate a data transfer between the account associated with the device 102 and the second account associated with remote device 112.

In some embodiments, the remote device 112 may further collect information related to the reading of the QR code 104 and provide the information to the services device. For example, the remote device 112 may collect a timestamp corresponding to when the capture element 114 scans the QR code 104. The remote device 112 may provide the timestamp to the services device. The services device may compare a timestamp corresponding to when the QR code 104 was initially displayed with the timestamp corresponding to when the QR code 104 was scanned to determine whether the data transfer is to be performed. For example, the service device may determine to allow the data transfer to go through when the timestamp corresponding to when the QR code 104 was initially displayed and the timestamp corresponding to when the QR code 104 was scanned are within a threshold period of time. If the timestamp corresponding to when the QR code 104 was initially displayed and the timestamp corresponding to when the QR code 104 was scanned are not within the threshold period of time, the services device may determine that the data transfer is not to be allowed to go through.

The remote device 112 may further define a value for a data transfer corresponding to the scanning of the QR code 104. For example, the remote device 112 may display a value for the data transfer and the device 102 may have been moved in a position where the QR code 104 can be scanned by the capture element 114 to indicate that a user of the device 102 has approved the data transfer with the value. The device 102 may indicate the value to the services device, where the services device may facilitate the data transfer with the value between the account associated with the device 102 and the account associated with the remote device 112.

FIG. 2 illustrates an example device 200 in accordance with some embodiments. The device 200 may be utilized in a data transfer in accordance with the embodiments herein. For example, the device 102 (FIG. 1) may include one or more of the features of the device 200.

The device 200 may include a user information application 202. The user information application 202 may include a plurality of instructions that, when executed by the device 200, cause the device 200 to perform one or more operations. The user information application 202 may manage one or more credentials that may be utilized for data transfers as described herein. The user information application 202 may cause the device to display indications of the credentials managed by the user information application 202 to allow a user of the device 200 to select a credential to be utilized for a data transfer. The user information application 202 may facilitate the data transfer between an account associated with the credential and an account associated with another device, such as a point of sale device.

The user information application 202 may include a credential extension 204. The credential extension 204 may include a plurality of instructions that, when executed by the device 200, cause one or more operations to be performed within the user information application 202. In some embodiments, the device 200 may further include one or more credential applications, such as the credential application 206. The credential application 206 may be associated with a credential managed by the user information application 202. The credential application 206 may be utilized for installing the credential extension 204 within the user information application 202. In some instances, the credential application 206 may be deleted from the device 200 while the credential extension may remain within the user information application 202.

The credential extension 204 may be sandboxed within the user information application 202. In particular, the credential extension 204 being sandboxed may limit the data and/or operations that the credential extension 204 may utilize within the user information application 202. The credential extension 204 may gather information from the user information application 202, such as information related to data transfers performed with the user information application 202. The sandboxing of the credential extension 204 may limit the information that the credential extension 204 is able to gather from the user information application 202. For example, the credential extension may be limited to gathering information regarding when a QR code (such as the QR code 104 (FIG. 1)) is displayed on the device 200, a location of the device 200, other information related to the QR codes or data transfers associated with the user information application 202, or some combination thereof. In some embodiments, a user of the device 200 may define which data and/or operations the credential extension 204 may utilize and which data and/or operations the credential extension 204 may not utilize.

The credential extension 204 may communicate with a services device associated with the credential. The services device may communicate with the credential extension 204 to define what information the credential extension 204 is to collect. For example, the services device may indicate information that the credential extension 204 is intended to collect. As the sandboxing of the credential extension 204 may limit the information that can be collected by the credential extension 204, the credential extension 204 may collect all of the information indicated by the services device, or the portion of the information that is indicated by the services device that is not prevented from being collected by the sandboxing of the credential extension 204. The credential extension 204 may provide the indicated information to the services device. For example, the credential extension 204 may provide the indicated information to the services device once a QR code has been displayed and/or once a data transfer has been initiated based on a QR code. The services device may utilize the information to determine whether a data transfer associated with the QR code is authorized.

The credential extension 204 and/or the credential application 206 may facilitate acquiring of additional QR codes by the device 200. For example, the credential extension 204 and/or the credential application 206 may monitor a number of valid QR codes stored on the device 200. The credential extension 204 and/or the credential application 206 may compare the number of QR codes stored on the device 200 to a threshold number of QR codes. When the number of QR codes stored on the device 200 is less than the threshold number of QR codes, the credential extension 204 and/or the credential application 206 may cause the device 200 to request additional QR codes from a QR provision device (such as the QR provision device 108 (FIG. 1)). Further, the credential extension 204 and/or the credential application 206 may facilitate provisioning of the additional QR codes to the device 200.

The device 200 may further include a memory 208. The memory 208 may store one or more QR codes 210 on the device. In particular, the QR codes received from the QR provision device 108 may be stored in the memory of the device 200. The QR codes stored in the memory 208 may be encrypted, such as to protect from unauthorized access to the QR codes. The user information application 202 and/or the credential extension 204 may retrieve the encrypted QR codes from the memory 208 and decrypt the QR codes for use.

The device 200 may further include a secure element 212. The secure element 212 may be an electrical component (such as a processor and/or a memory device) that is configured to limit entities (such as applications and/or other devices) that can utilize the secure element 212 and/or access data stored on the secure element 212. The secure element 212 may be programmed with the entities that can utilize and/or access the secure element 212 prior to implementation into an end product (for example, the device 200), where the entities may not be redefinable once the secure element 212 is implemented in an end product.

The device 200 may store one or more keys 214 within the secure element 212. Each of the keys 214 may correspond to a corresponding QR code stored within the memory 208 of the device 200. The device 200 may have the user perform an authentication procedure (such as biometric (facial and/or fingerprint) recognition) to allow access to the keys 214 within the secure element 212. The secure element 212 may allow a single key of the keys 214 to be retrieved per each authentication procedure. For example, the user information application 202 and/or the credential extension 204 may request a key from secure element 212 to be used to decrypt a corresponding QR code retrieved from the memory 208. In response to the request, the device 200 may have a user of the device 200 perform an authentication procedure to authenticate that the user causing the request is a user who is authorized to access the keys 214. If the user is properly authenticated, the secure element 212 may allow the user information application 202 and/or the credential extension 204 to retrieve the key corresponding to the QR code to be decrypted. Each key may have a single corresponding QR code, such that a single key may be utilized to decrypt a single QR code. The keys 214 may be received from the QR provision device along with the corresponding QR codes 210.

In other embodiments, the secure element 212 may store a key that can be utilized to decrypt multiple of the QR codes 210 stored in the memory 208. In these embodiments, the user information application 202 and/or the credential extension 204 may limit the number of QR codes that can be decrypted at a time. For example, the user information application 202 and/or the credential extension 204 may retrieve the key from the secure element based on an authentication of the user of the device 200. The user information application 202 and/or the credential extension 204 may limit the number of QR codes that can be decrypted by the key at the time. The user information application 202 and/or the credential extension 204 may limit the number of QR codes to be decrypted by the key to one per proper authentication of the user.

Figure 3:
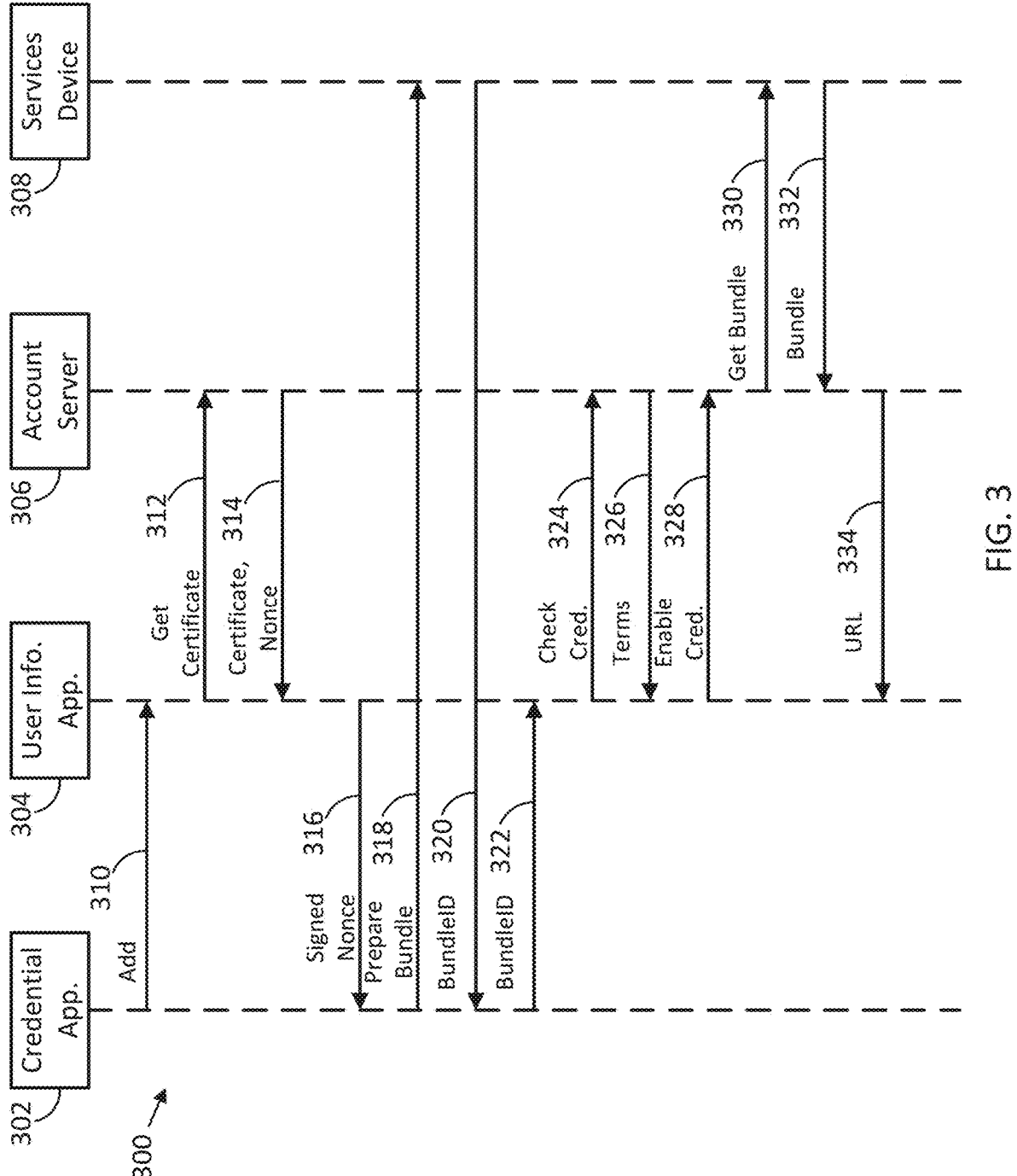
FIG. 3 illustrates a first portion of an example signal flow for provisioning of a credential and/or a credential extension to a device in accordance with some embodiments.

FIG. 3 illustrates a first portion of an example signal flow 300 for provisioning of a credential and/or a credential extension to a device in accordance with some embodiments. For example, the signal flow 300 illustrates an example procedure for adding a credential and/or credential extension (such as the credential extension 204 (FIG. 2)) to a user information application (such as the user information application 202 (FIG. 2)) on a device (such as the device 200 (FIG. 2)). The signal flow 300 further illustrates an example procedure for provisioning QR codes (such as the QR code 104 (FIG. 1) and/or the QR codes 210 (FIG. 2)) to the device. It should be understood that one or more of the operations described in the signal flow 300 may be performed concurrently and/or in a different order than illustrated. Additionally, one or more of the operations may be omitted in other embodiments.

The signal flow 300 may occur between a plurality of entities. For example, the entities may include a credential application 302. The credential application 302 may include one or more of the features of the credential application 206 (FIG. 2). The credential application 302 may reside on the device and may be executed by the device. The credential application 302 may be associated with a credential to be provisioned to the device.

The entities may further include a user information application 304. The user information application 304 may include one or more of the features of the user information application 202 (FIG. 2). The user information application 304 may reside on the device and may be executed by the device. The user information application 304 may manage one or more credentials stored on the device. For example, the user information application 304 may allow a user of the device to select among credentials stored on the device and initiate data transfers with accounts associated with the credentials. The user information application 304 may further cause the device to display QR codes associated with the credentials for initiation of a data transfer for the accounts related to the credentials.

The entities may further include an account server 306. The account server 306 may be separate from the device and may manage user accounts associated with the user information application 304. The account server 306 may store information associated with the device, users of the device, the credentials stored on the device, or some combination thereof. For example, the account server 306 may maintain user accounts (such as user names and/or passwords that allows access to user accounts corresponding to the credentials) for the user information application 304. The account server 306 may facilitate data transfers associated with credentials of the user information application 202 and/or facilitate receipt of QR codes associated with the credentials of the user information application 202.

The entities may further include a services device 308. The services device 308 may be separate from the device and may manage accounts associated with the credentials of the user information application. For example, the services device 308 may maintain one or more accounts associated with one or more credentials of the user information application 202. The services device 308 may perform data transfers between the one or more of the accounts stored on the services device 308, and/or between an account stored on the services device 308 and an account stored on another device.

In 310, a request to add a credential may be provided to the user information application 304. For example, the credential application 302 may generate and transmit a request to the user information application 304 to add a credential to the credentials maintained by the user information application 304. A user of the device may indicate in the credential application 302 a request to add a credential associated with the credential application 302 to the credentials in the user information application 304. The credential application 302 may provide the request in 310 to the user information application 304 based on the user indication of the addition of the credential to the user information application 304.

In 312, a request for certificates and/or a nonce may be provided to the account server 306. In particular, the user information application 304 may generate and transmit a request for one or more certificates and/or a nonce from the account server 306. The certificates and/or the nonce requested may relate to the credential to be provisioned to the user information application 304.

In 314, the account server 306 may provide the one or more certificates and/or the nonce to the user information application 304. In particular, the account server 306 may transmit the certificates and/or the nonce requested in 312 to the user information application 304.

In 316, the user information application 304 may provide the one or more certificates, the nonce, and/or a signed nonce to the credential application 302. For example, the user information application 304 may sign the nonce received from the account server 306 to produce the signed nonce. The signed nonce may verify that the nonce has not been tampered with. The user information application 304 may transmit the certificates, the nonce, and/or the signed nonce to the credential application 302.

In 318, the credential application 302 may provide a provisioning bundle preparation request to the services device 308. The provisioning bundle preparation request may request that the services device 308 generate a provisioning bundle for provisioning the credential and/or credential extension to the user information application 304.

The provisioning bundle preparation request may include the certificates received in 316.

In 320, the services device 308 may provide an identifier for an encrypted provisioning bundle (which may be referred to as a "bundle identifier") to the credential application 302. In particular, the services device 308 may generate a provisioning bundle based on the provisioning bundle preparation request received in 318. The provisioning bundle may be utilized for provisioning the credential and/or the credential extension to the user information application 304. The services device 308 may further encrypt the provisioning bundle. The services device 308 may generate a bundle identifier that indicates the encrypted provisioning bundle. The bundle identifier may be utilized by the services device 308 for identifying the encrypted provisioning bundle. The services device 308 may transmit the bundle identifier for the encrypted provisioning bundle to the credential application 302, which may use the bundle identifier to refer to the encrypted provisioning bundle.

In 322, the credential application 302 may provide the bundle identifier, the nonce, and/or the signed nonce to the user information application 304. The bundle identifier may indicate what is being provisioned and may provide a link to an account on the services device corresponding to the provisioning bundle. The nonce may be utilized to verify that the provisioning occurs a single time. The signed nonce may be utilized to verify that the nonce has not been tampered with. The credential application 302 may transmit the bundle identifier, the nonce, and/or the signed nonce to the user information application 304.

In 324, the user information application 304 may provide a check credential request to the account server 306. The check credential request may request that the account server 306 verify that the credential is authorized to be added to the user information application 304. The check credential request may include the bundle identifier that indicates the provisioning bundle. The user information application 304 may transmit the check credential request to the account server 306.

In 326, the account server 306 may provide terms to the user information application 304. For example, the account server 306 may generate terms that indicate features to be provided for provision and/or use of the credential. The account server 306 may transmit the terms to the user information application 304.

In 328, the user information application 304 may provide an enable credential request to the account server 306. For example, the user information application 304 may produce a credential identifier that refers to the credential stored in the user information application 304. The enable credential request may request that the credential be enabled within the user information application 304. The user information application 304 may transmit the enable credential request to the account server 306

In 330, the account server 306 may provide a request for the provisioning bundle to the services device 308. The request for the provisioning bundle may request that the services device 308 provide the provisioning bundle associated with the bundle identifier to the account server 306. The request for the provisioning bundle may include the bundle identifier and/or an encryption certificate chain. The encryption certificate chain may be generated based on the certificates received by the user information application in 314. The account server 306 may transmit the request for the provisioning bundle to the services device 308.

In 332, the services device 308 may provide the provisioning bundle to the account server 306. The provisioning bundle provided by the services device 308 may be an encrypted provisioning bundle as encrypted by the services device. The encrypted provisioning bundle may include data in encrypted format of what is to be provisioned to the user information application 304. The encrypted provisioning bundle may further indicate files that the services device 308 expects to include in the credential. The services device 308 may transmit the provisioning bundle to the account server 306.

In 334, the account server 306 may transmit a credential uniform resource locator (URL) to the user information application 304. The credential URL may indicate a location from which the user information application can access the provisioning bundle. The user information application 304 may utilize the credential URL to download the data that can be utilized for indicating the credential in the user information application 304.

Figure 4:
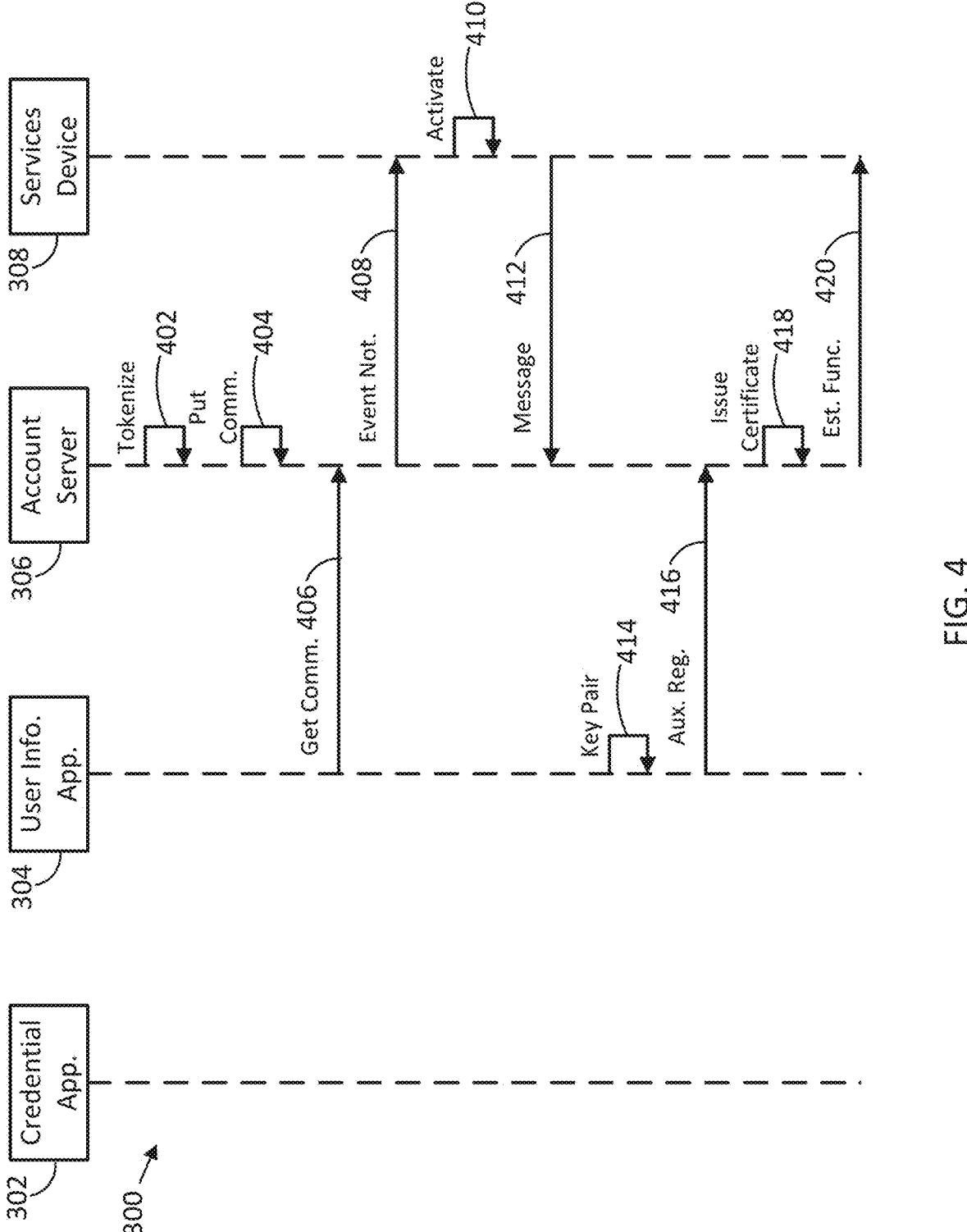
FIG. 4 illustrates a second portion of the signal flow of FIG. 3 for provisioning of a credential and/or a credential extension to a device in accordance with some embodiments.

FIG. 4 illustrates a second portion of the signal flow 300 for provisioning of a credential and/or a credential extension to a device in accordance with some embodiments. In particular, the signal flow 300 may proceed from 334 to 402.

In 402, the account server 306 may tokenize the bundle identifier. For example, the account server 306 may generate a device primary account number (DPAN) associated with the bundle identifier. The DPAN or the bundle identifier may be used later for performance of some data transfers, such as where the QR codes are not utilized for the data transfers. The DPAN or the bundle identifier may be issued to the user information application 304, where the user information application 304 may utilize the DPAN or the bundle identifier for performance of data transfers. The user information application 304 may detokenize the DPAN into the bundle ID and provide the DPAN to the credential application to perform a data transfer.

In 404, the account server 306 may store one or more pending commands. For example, the account server 306 may utilize a put command to store a pending commands. The pending commands may be related to the user information application 304 and to the provisioning of the credential and/or the credential extension onto the user information application 304.

In 406, the user information application 304 may request the pending commands stored in 404. For example, the user information application 304 may transmit a get command to the account server 306 for the pending commands stored in 404. The pending commands may In 408, the account server 306 may provide a provisioning success notification to the services device 308. The provisioning success notification may comprise an event notification that indicates that the provisioning was a success. For example, the provisioning success notification may indicate that the credential and/or the credential extension was successfully provisioned to the user information application. The account server 306 may transmit the provisioning success notification to the services device 308 based on the credential and/or the credential extension being successfully provisioned to the user information application 304.

In 410, the services device 308 may activate the credential. In particular, the services device 308 may activate the credential based on the indication that the provisioning of the credential and/or credential extension was successfully provisioned in 408. Activation of the credential may allow for data transfers to be performed with an account associated with the credential extension.

In 412, the services device 308 may provide a message to the account server 306 indicating that the credential has been activated. For example, the services device 308 may provide a 200 type message to the account server 306 to indicate that the credential has been activated.

In 414, the user information application 304 may generate one or more key pairs. For example, the user information application 304 may generate an encryption key pair and/or a signature key pair in some embodiments.

In 416, the user information application 304 may perform an auxiliary registration with the account server 306. For example, the user information application 304 may provide information to the account server 306 for auxiliary registration. The auxiliary registration message provided by the user information application 304 to the account server 306 may include the bundle identifier, device signatures corresponding to the device on which the user information application 304 is executed, barcode encryption certificate signing request (CSR)s, a device signature CSRs, an indication of certificates being requested, or some combination thereof. The user information application 304 may provide the barcode encryption CSR and/or the device signature CSRs to the account server 306 to allow the account server 306 to issue certificates. The user information application 304 may transmit the auxiliary registration message to the account server 306.

In 418, the account server 306 may issue one or more certificates. For example, the account server 306 may issue one or more certificates based on the auxiliary registration in 416. The certificates issued by the account server 306 may include a barcode encryption certificate and/or a device signing certificate.

In 420, the account server 306 may establish functionality with the services device 308. For example, the account server 306 may request issue of certificates from the services device 308. The certificates issued by the services device 308 may be utilized by the services device 308 to encrypt the QR codes to the device on which the user information application 304 and the credential application 302 are being executed. Once encrypted, only the device on which the user information application 304 and the credential application 302 are being executed may decrypt the code. The request for the issue of the certificates may include the bundle identifier, the barcode encryption certificates, the device signature certificates, an indication of the certificates requested, an account server signature, fraud data, or some combination thereof. The account server 306 may transmit the request to issue certificates to the services device 308.

Figure 5:
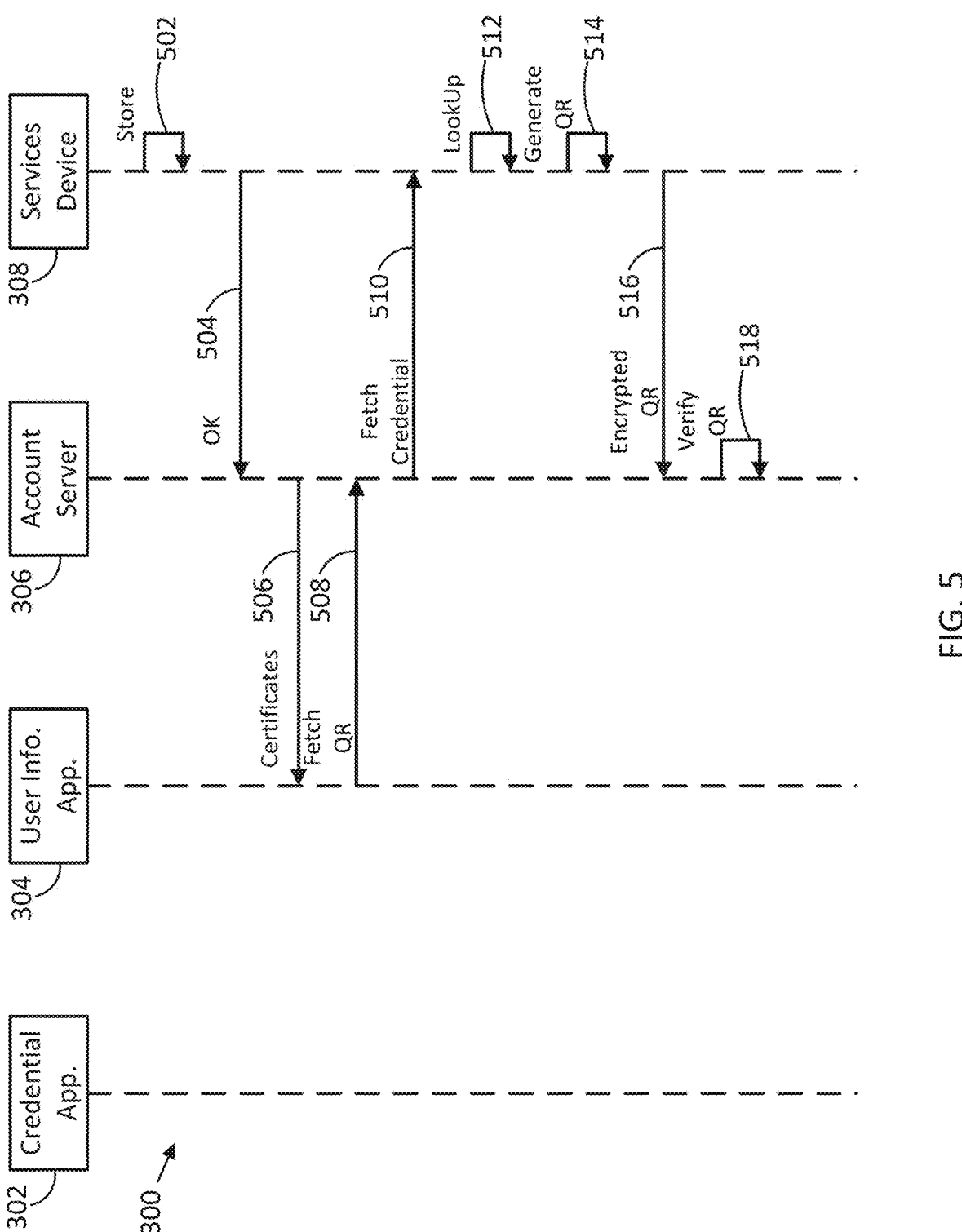
FIG. 5 illustrates a third portion of the signal flow of FIG. 3 for provisioning of a credential and/or a credential extension to a device in accordance with some embodiments.

FIG. 5 illustrates a third portion of the signal flow 300 for provisioning of a credential and/or a credential extension to a device in accordance with some embodiments. In particular, the signal flow 300 may proceed from 420 to 502.

In 502, the services device 308 may store information provided in 420. For example, the services device 308 may store the bundle identifier, the barcode encryption certificates, the device signature certificates, or some combination thereof. The services device may store the barcode encryption certificates and/or the device signature certificates against the bundle identifier such that the certificates can be utilized for the bundle identifier in the future.

In 504, the services device 308 may provide an indication that certificates have been stored in 502 to the account server 306. For example, the services device 308 may transmit an okay message to the account server 306 that indicates that the certificates have been stored by the services device 308.

In 506, the account server 306 may provide certificates to the user information application 304. For example, the account server 306 may device signature certificates, barcode encryption certificates, device encryption certificates, or some combination thereof to the user information application 304. The user information application 304 may utilize the certificates to request QR codes from the services device 308.

In 508, the user information application 304 may request QR codes to be fetched. In particular, the user information application 304 may be indicating to the account server 306 and/or the services device 308 that the user information application 304 is requesting additional QR codes. The user information application 304 may transmit a fetch request to the account server 306 to request additional QR codes be provided to the user information application 304. The fetch request may include the bundle identifier, a number of QR codes that the user information application 304 is requesting and is expecting to receive, a last used credential identifier, barcode encryption certificates, a device signature, or some combination thereof.

In 510, the account server 306 may provide a fetch credential request to the services device 308. For example, the account server 306 may indicate that the user information application 304 has requested additional QR codes. The fetch credential request may include the bundle identifier, an indication of the credential type, the last used credential identifier, the number of QR codes that the user information application 304 is requesting and is expecting to receive, barcode encryption certificates, an account server signature, fraud data, or some combination thereof. The account server 306 may transmit the fetch credential request to the services device 308 based on the fetch request from 508.

In 512, the services device 308 may look up an encryption certificate. In particular, the services device 308 is to look up the encryption certificate based on the bundle identifier. For example, the services device 308 may look up the barcode encryption certificate from 502.

In 514, the services device 308 may generate one or more QR codes for the user information application. For example, the services device 308 may generate one or more QR codes and encrypt the one or more QR codes. The services device 308 may generate a number of QR codes equal to the number of QR codes that the user information application 304 is requesting and is expecting to receive. An algorithm for encrypting the QR codes may be proprietary to the services device 308. The services device 308 may individually encrypt each of the QR codes.

In 516, the services device 308 may provide the QR codes to the account server 306. For example, the services device 308 may transmit the encrypted QR codes produced in 514 to the account server 306. The services device 308 may provide an indication of the credential type, expiration time/date, bundle identifier, value, or some combination thereof to the account server 306 along with the QR codes.

In 518, the account server 306 may verify that the QR codes were individually encrypted. In particular, the account server 306 may verify that the QR codes were individually encrypted in 514. In some embodiments, the account server 306 may verify that the QR codes were individually encrypted based on the credential type indicated in 516.

Figure 6:
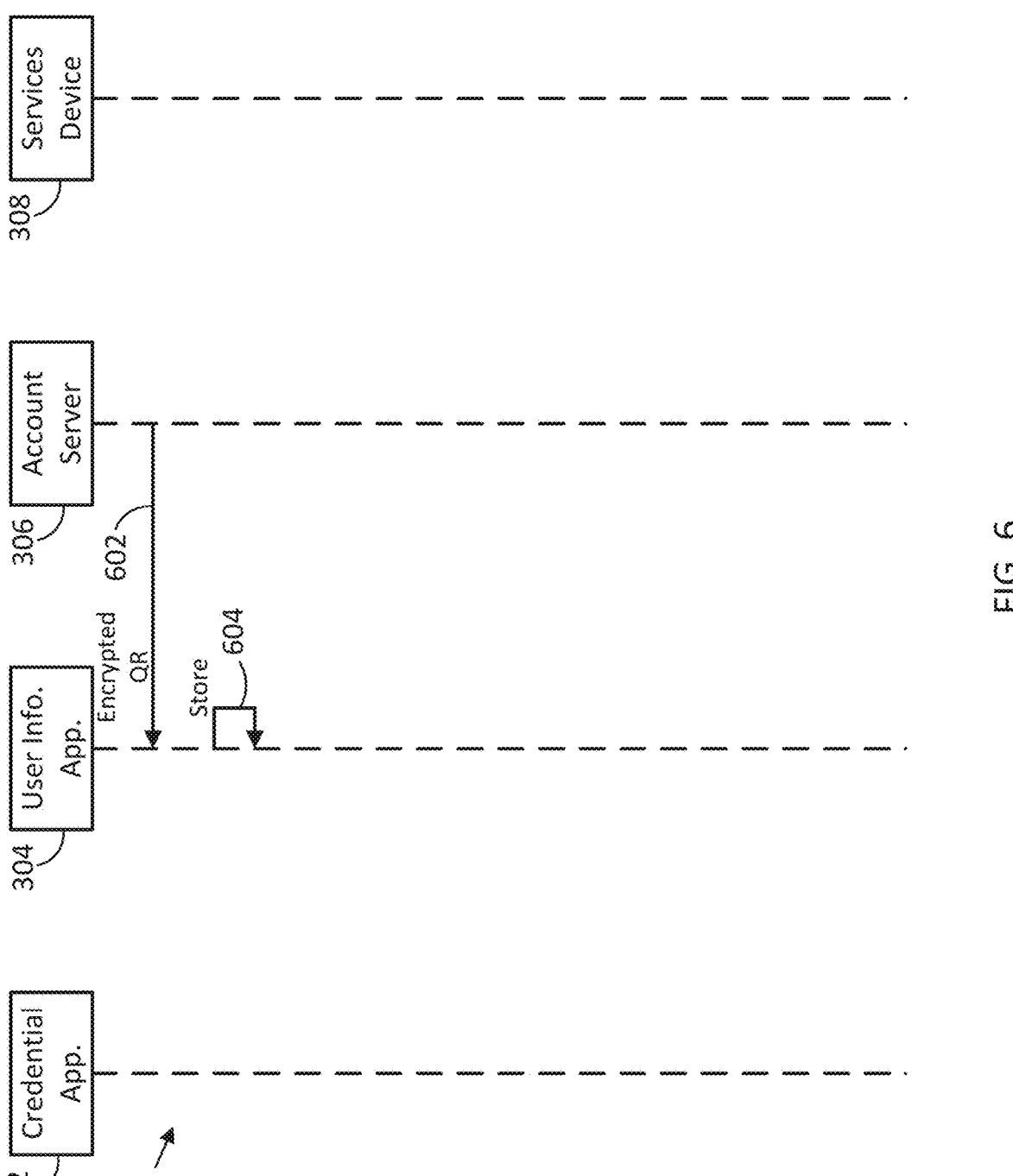
FIG. 6 illustrates a fourth portion of the signal flow of FIG. 3 for provisioning of a credential and/or a credential extension to a device in accordance with some embodiments.

FIG. 6 illustrates a fourth portion of the signal flow 300 for provisioning of a credential and/or a credential extension to a device in accordance with some embodiments. In particular, the signal flow 300 may proceed from 518 to 602.

In 602, the account server 306 may provide the QR codes to the user information application 304. For example, the account server 306 may transmit the encrypted QR codes to the user information application 304. The account server 306 may provide an indication of the expiration time/date, bundle identifier, and/or value to the user information application 304. The user information application 304 may utilize the expiration time/date to determine a time that the QR codes are to become invalid if stored by the device without being used.

In 604, the user information application 304 may store the QR codes. For example, the user information application 304 may store the encrypted QR codes associated with the credential and/or a user associated with the credential.

Figure 7:
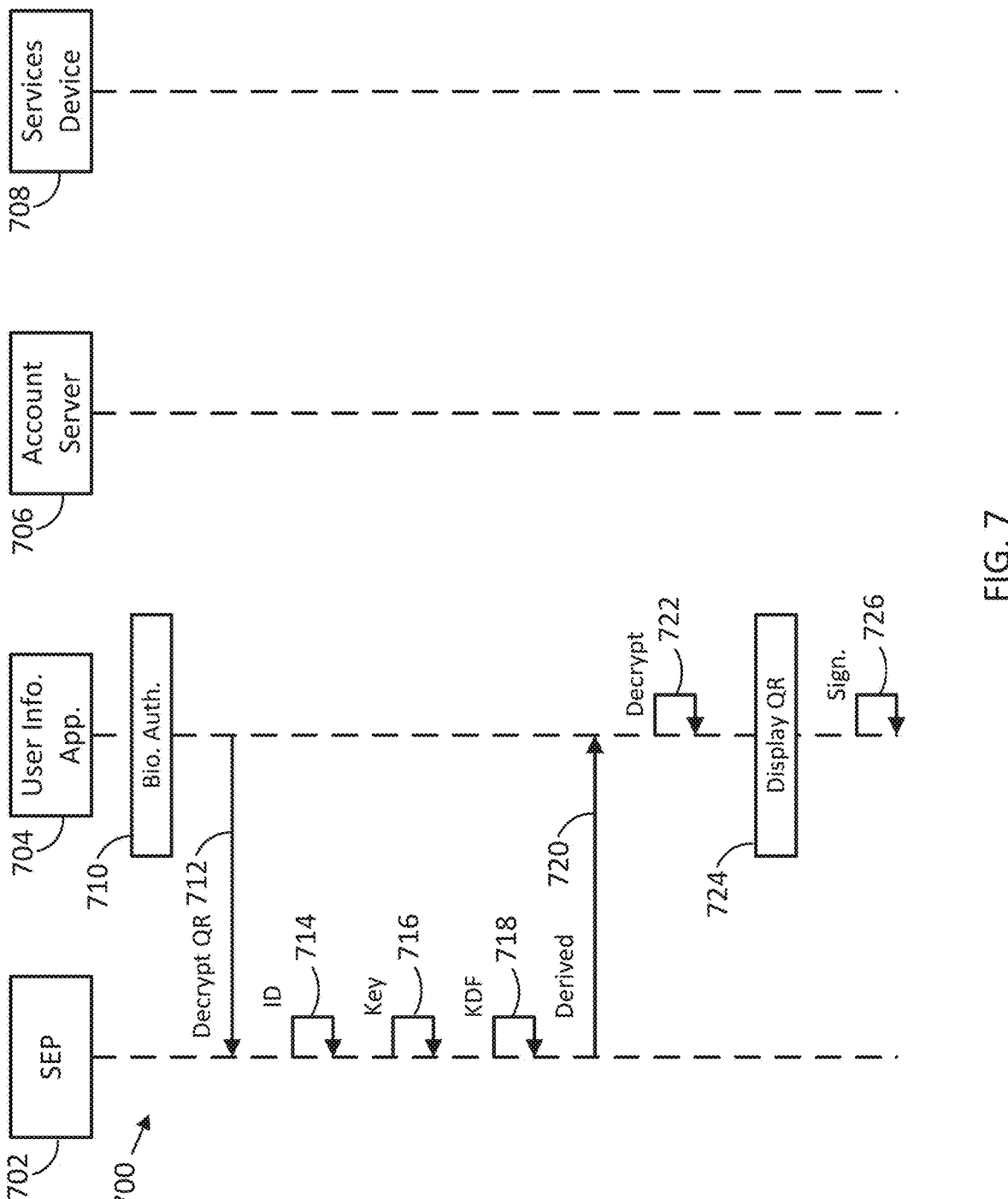
FIG. 7 illustrates a first portion of an example signal flow for initiation of a data transfer based on a quick response (QR) code in accordance with some embodiments.

FIG. 7 illustrates a first portion of an example signal flow 700 for initiation of a data transfer based on a QR code in accordance with some embodiments. The signal flow 700 may further illustrate QR code replenishment in accordance with some embodiments. For example, the signal flow 700 illustrates an example procedure for displaying a QR code (such as the QR code 104 (FIG. 1)) on a display of a device (such as the device 102 (FIG. 1)) and initiation of a data transfer based on a scanning of the QR code by a remote device (such as the remote device 112 (FIG. 1)). The signal flow 700 further illustrates replenishment of QR codes stored on the device (such as the QR codes 210 (FIG. 2)) stored in the memory 208 (FIG. 2) of the device 200 (FIG. 2)). It should be understood that one or more of the operations described in the signal flow 700 may be performed concurrently and/or in a different order than illustrated. Additionally, one or more of the operations may be omitted in other embodiments.

The signal flow 700 may occur among a plurality of entities. For example, the signal flow 700 may occur among a secure enclave processor (SEP) 702, a user information application 704, an account server 706, and a services device 708 in the illustrated embodiment. The SEP 702 may include a dedicated secure subsystem that is isolated from a main processor of a device to provide an extra layer of security and keep sensitive user data secure. The SEP 702 may be dedicated solely for certain defined uses, such as secure enclave use. The user information application 704 may include one or more of the features of the user information application 304 (FIG. 3). The account server 706 may include one or more of the features of the account server 306 (FIG. 3). The services device 708 may include one or more of the features of the services device 308 (FIG. 3).

In 710, the user information application 704 may perform a biometric authentication. For example, a user may select a credential from the user information application 704 to be utilized for a data transfer with a QR code. The credential may be associated with an account maintained by the services device, and the account may be identified based on the credential. Based on the user selecting the credential, the user information application 704 may perform biometric authentication (such as facial identification and/or fingerprint identification) to authenticate the user. The user information application 704 may perform the biometric authentication to determine that the user of the device is a user that is authorized to perform data transfers associated with the credential.

In 712, the user information application 704 may request information for decryption of a QR code from the SEP 702. For example, the user information application 704 may provide an indication of an encrypted QR code stored on the device executing the user information application 704, along with a request for information for decryption of the QR code.

In 714, the SEP 702 may analyze the identification from the biometric authentication in 710 to determine whether the user is a user authorized to utilize the QR codes. If the SEP 702 determines that the user is not a user authorized to utilize the QR codes, the signal flow 700 may be terminated.

If the SEP 702 determines that the user is authorized to utilize the QR codes, the signal flow 700 may continue.

In 716, the SEP 702 may perform a key agreement procedure to determine a key to be utilized for decoding the QR code. The key agreement procedure may be based on a private basic attestation authority (BAA) key and/or a public ephemeral key. The BAA key may provide digital signatures that can be utilized for verifying that a device having the SEP 702 is authentic.

In 718, the SEP 702 may perform a key derivation function (KDF) to produce a key for decrypting the QR code. The KDF may be performed with an ShS. The KDF of the ShS may produce the key for decrypting the QR code.

In 720, the SEP 702 may provide the derived key produced in 718 to the user information application 704. For example, the SEP 702 may transmit the derived key to the user information application 704.

In 722, the user information application 704 may utilize the derived key received in 720 to derive the QR code. For example, the user information application 704 may utilize the key to decrypt the encrypted QR code indicated in the request from 712. The user information application 704 may produce the decrypted QR code through the decryption of the encrypted QR code.

In 724, the user information application 704 may display the QR code on a display of the device. For example, the user information application 704 may cause the decrypted QR code to be displayed on the device executing the user information application 704.

In 726, the user information application 704 may sign a timestamp and a last used credential identifier. For example, the user information application 704 may identify a timestamp corresponding to a time that the QR code was initially displayed on the device. Further, the user information application 704 may identify an identifier associated with the credential for which the QR code is being utilized, which may be used as the last used credential identifier. The user information application 704 may generate a device signature based on the timestamp and/or the last used credential identifier.

Figure 8:
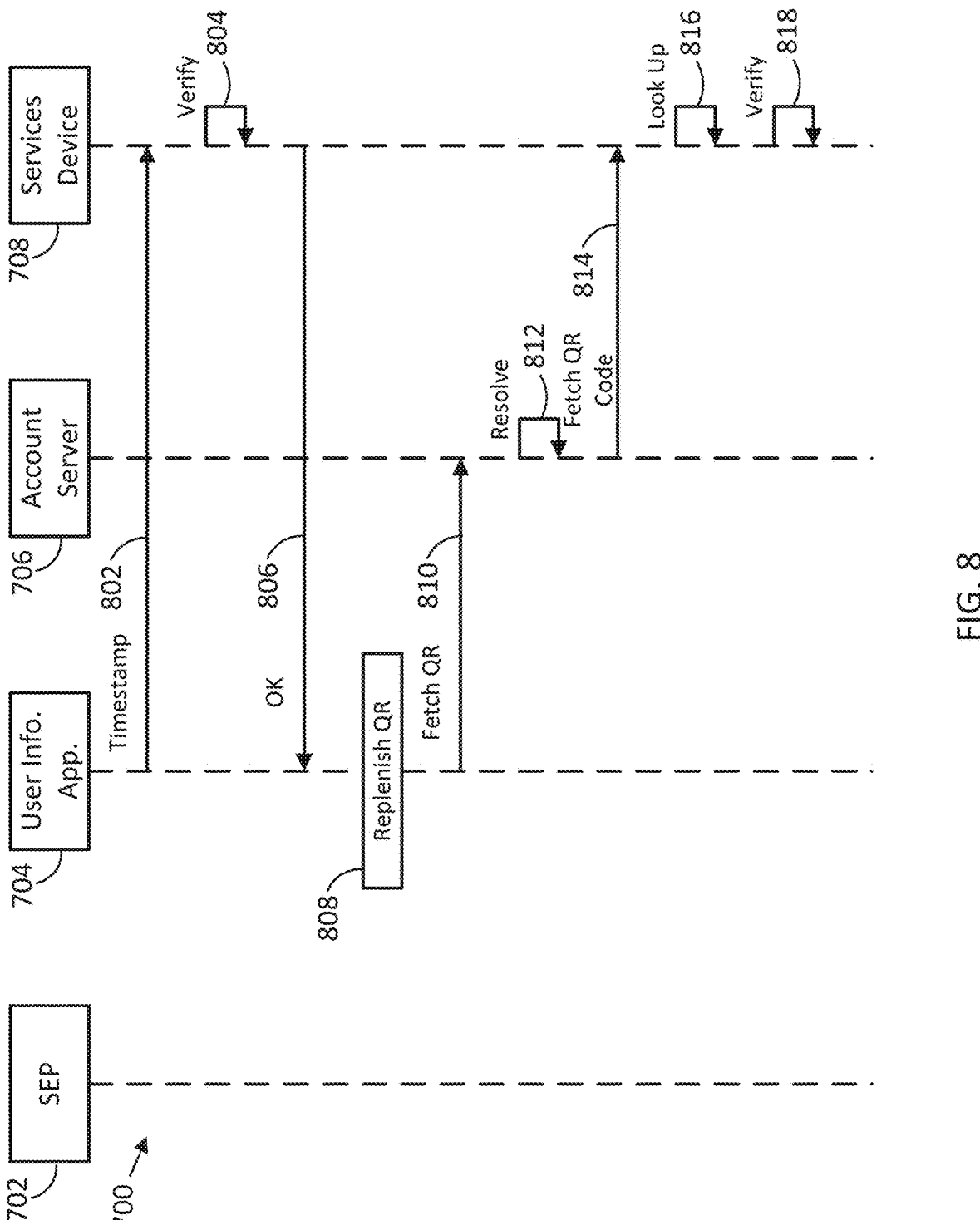
FIG. 8 illustrates a second portion of the signal flow of FIG. 7 for initiation of a data transfer based on a QR code in accordance with some embodiments.

FIG. 8 illustrates a second portion of the signal flow 700 for initiation of a data transfer based on a QR code in accordance with some embodiments. In particular, the signal flow 700 may proceed from 726 to 802.

In 802, the user information application 704 may provide timestamp information to the services device 708. For example, the user information application 704 may provide information related to the timestamp identified in 726 to the services device 708. The timestamp information may include the timestamp, the device signature, the last used credential identifier, or some combination thereof. The services device 708 may utilize the timestamp to determine whether the QR code is scanned within an allowed time period (such as three minutes) from the QR code being displayed to determine whether the data transfer is to be allowed.

In 804, the services device 708 may verify the device signature. In particular, the services device 708 may verify that the device signature received from the user information application 704 in 802 is valid. Verifying the device signature may assist the services device 708 to identify an account associated with the credential and/or verifying that the device is authorized to be perform a data transfer with the account.

In 806, the services device 708 may provide an indication to the user information application 704 that the device signature has been verified. For example, the services device

708 may transmit an OK message to the user information application 704 to indicate that the device signature has been verified.

In 808, the user information application 704 may determine to replenish the QR codes stored on the device. For example, the user information application 704 may determine that the number of valid QR codes stored on the device is less than a threshold number of QR codes to be stored on the device. Whether a QR code is valid or invalid may be determined based on the approaches described throughout this disclosure, such as whether the QR code has already been utilized for a data transfer, an amount of time that the QR code has been stored on the device, or some combination thereof. Based on the user information application 704 determining that the number of valid QR codes stored on the device is less than the threshold number of QR codes to be stored on the device, the user information application may determine to replenish the QR codes.

In 810, the user information application 704 may provide a request to fetch additional QR codes to the account server 706. The request to fetch additional QR codes may include a DPAN identifier corresponding to the credential for which the additional QR codes are being fetched and/or corresponding to the device. The user information application 704 may transmit the request to fetch the additional QR codes to the account server 706.

In 812, the account server 706 may resolve a provisioning bundle identifier (which may be referred to as a bundle identifier). For example, the account server 706 may determine a bundle identifier associated with the DPAN identifier received in 810. For example, the account server 706 may identify a bundle identifier associated with the credential based on the DPAN identifier.

In 814, the account server 706 may provide a request to fetch QR codes for a credential to the services device 708. The request may include an indication of a credential type, the bundle identifier, an indication of a number of QR codes being requested by the user information application 704, and account signature, or some combination thereof. The account server 706 may transmit the request to fetch the QR codes to the services device 708 based on the request to fetch additional QR codes received from the user information application 704 in 810.

In 816, the services device 708 may look up an encryption certificate. For example, the services device 708 may look up an encryption certificate based on the bundle identifier received in 814.

In 818, the services device 710 may verify an account signature. For example, the services device 708 may verify the account signature received in 814.

Figure 9:
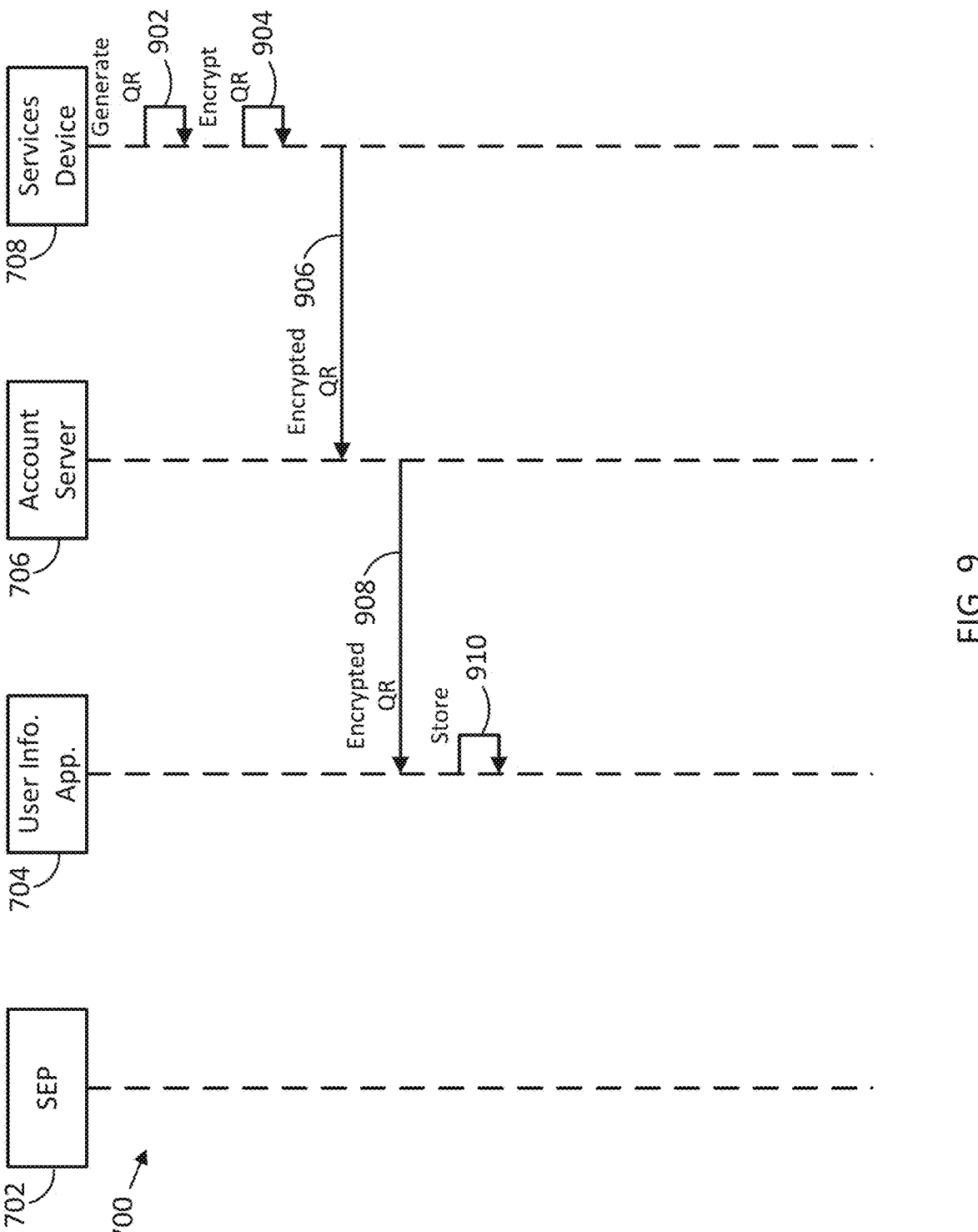
FIG. 9 illustrates a third portion of the signal flow FIG. 7 for initiation of a data transfer based on a QR code in accordance with some embodiments.

FIG. 9 illustrates a third portion of the signal flow 700 for initiation of a data transfer based on a QR code in accordance with some embodiments. In particular, the signal flow 700 may proceed from 818 to 902.

In 902, the services device 708 may generate one or more QR codes. The services device 708 may generate the QR codes based on the verification of the account signature in 818. The services device 708 may generate a number of QR codes equal to the number of QR indicated in 814.

In 904, the services device 708 may encrypt the QR codes. For example, the services device 708 may encrypt the QR codes generated in 902. The services device 708 may apply a proprietary algorithm to the QR codes to encrypt the QR codes to produce encrypted QR codes.

In 906, the services device 708 may provide the encrypted QR codes to the account server 706. For example, the services device 708 may transmit the encrypted QR codes encrypted in 904 to the account server 706.

In 908, the account server 706 may provide the encrypted QR codes to the user information application 704. For example, the account server 706 may transmit the encrypted QR codes received in 906 to the user information application 704.

In 910, the user information application 704 may store the encrypted QR codes. For example, the user information application 704 may store the encrypted QR codes received in 908. The user information application 704 may store the encrypted QR codes in a memory of the device, such as the memory 208 (FIG. 2). The user information application 704 may store the encrypted QR codes for use in association with future data transfers.

Figure 10:
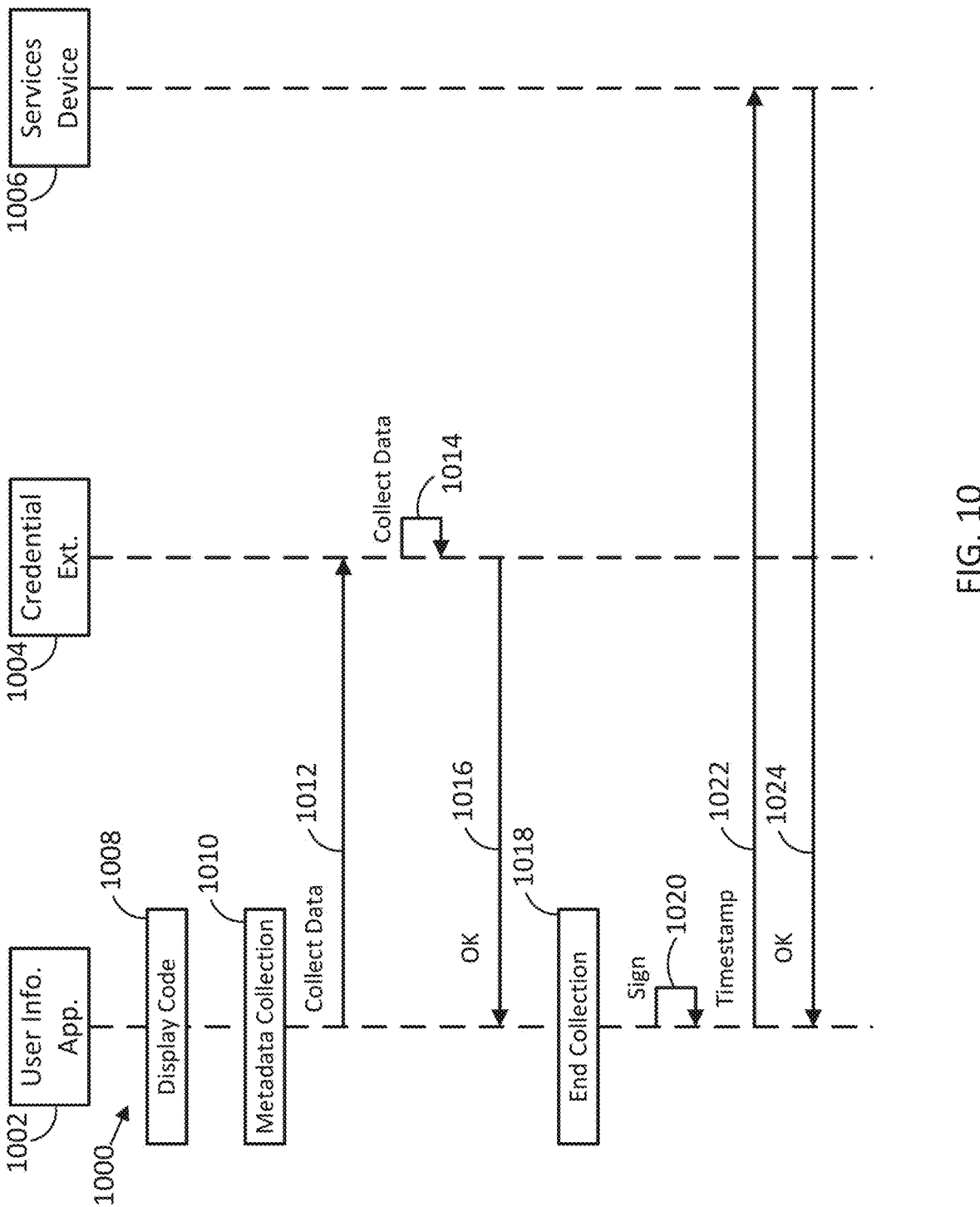
FIG. 10 illustrates an example signal flow for display of a QR code and fraud detection in accordance with some embodiments.

FIG. 10 illustrates an example signal flow 1000 for display of a QR code and fraud detection in accordance with some embodiments. For example, the signal flow 1000 illustrates an example procedure for displaying a QR code (such as the QR code 104 (FIG. 1)) and providing information to a service device for determining whether a requested data transfer is fraudulent. It should be understood that one or more of the operations described in the signal flow 1000 may be performed concurrently and/or in a different order than illustrated. Additionally, one or more of the operations may be omitted in other embodiments.

The signal flow 1000 may occur between a plurality of entities. For example, the entities may include a user information application 1002, a credential extension 1004, and a services device 1006 in the illustrated embodiment. The user information application 1002 may include one or more of the features of the user information application 202 (FIG. 2), the user information application 304 (FIG. 3), and/or the user information application 704 (FIG. 7). The credential extension 1004 may include one or more of the features of the credential extension 204 (FIG. 2). The services device 1006 may include one or more of the features of the services device 308 (FIG. 3) and/or the services device 708 (FIG. 7).

In 1008, the user information application 1002 may display a QR code. For example, the user information application 1002 may cause a QR code to be displayed on a display of the device executing the user information application 1002.

In 1010, the user information application 1002 may initiate metadata collection. For example, the user information application 1002 may begin conditional event metadata collection based on the QR code being displayed on the display of the device. The user information application may collect data associated with the QR code. In some embodiments, the data collected by the user information application 1002 may include data requested by the credential extension 1004 to be collected. The data to be collected may be defined via the services device 1006, which may communicate with the credential extension 1004 to indicate the data to be collected and/or to receive the collected data from the credential extension 1004.

In 1012, the user information application 1002 may provide the collected data to the credential extension 1004. For example, the user information application 1002 may transmit the data collected in 1010 to the credential extension 1004. The user information application 1002 may provide an indication of the QR code identifier (which may be referred to as a last used barcode identifier) corresponding to the QR code being displayed.

In 1014, the credential extension 1004 may determine a portion of the received data to be provided to the services device for determining whether a data transfer associated with the barcode is to be performed. The credential extension may encrypt the portion of the data and provide the encrypted data to the services device 1006. In other embodiments, the user information application 1002 may provide the encrypted data to the services device 1006. The encryption of the portion of the data may prevent bad actors and/or any entities through which the encrypted data is transmitted to the services device 1006 from accessing the data.

In 1016, the credential extension 1004 may provide an indication to the user information application 1002 that the credential extension 1004 has received the data to be provided to the services device 1006. For example, the credential extension 1004 may transmit an OK message indicating that the event metadata has been received from the user information application.

In some embodiments, 1012 through 1016 may be omitted. For example, 1012 through 1016 may be omitted when a credential application (such as the credential application 302 (FIG. 3)) is not installed on the device or the credential extension 1004 has not been implemented within the user information application 1002.

In 1018, the user information application 1002 may stop collecting metadata. For example, the user information application 1002 may end the conditional event metadata collection corresponding to the display of the QR code.

In 1020, the user information application 1002 may produce a signature. For example, the user information application 1002 may identify a timestamp, a QR code identifier (which may be referred to as a barcode identifier), an authentication type, a device account identifier, a biometrics change indication, conditional event metadata from the metadata collection, or some combination thereof. The user information application 1002 may produce the signature based on the timestamp, the QR code identifier, the authentication type, the device account identifier, the biometrics change indication, the conditional event metadata, or some combination thereof.

In 1022, the user information application 1002 may provide timestamp information to the services device 1006. The timestamp information may include the timestamp, the QR code identifier, the authentication type, the device account identifier, the biometrics change indication, the condition event metadata, and/or the signature from 1020. The user information application 1002 may transmit the timestamp information to the services device 1006.

In 1024, the services device 1006 may provide an indication to the user information application 1002 that a data transfer corresponding to the display of the QR code may be performed. For example, the services device 1006 may determine that the data transfer is authorized to be performed based at least in part on the timestamp information received in 1022. The services device 1006 may transmit an indication to the user information application 1002 that the data transfer may be performed based on the authorization of the data transfer.

Figure 11:
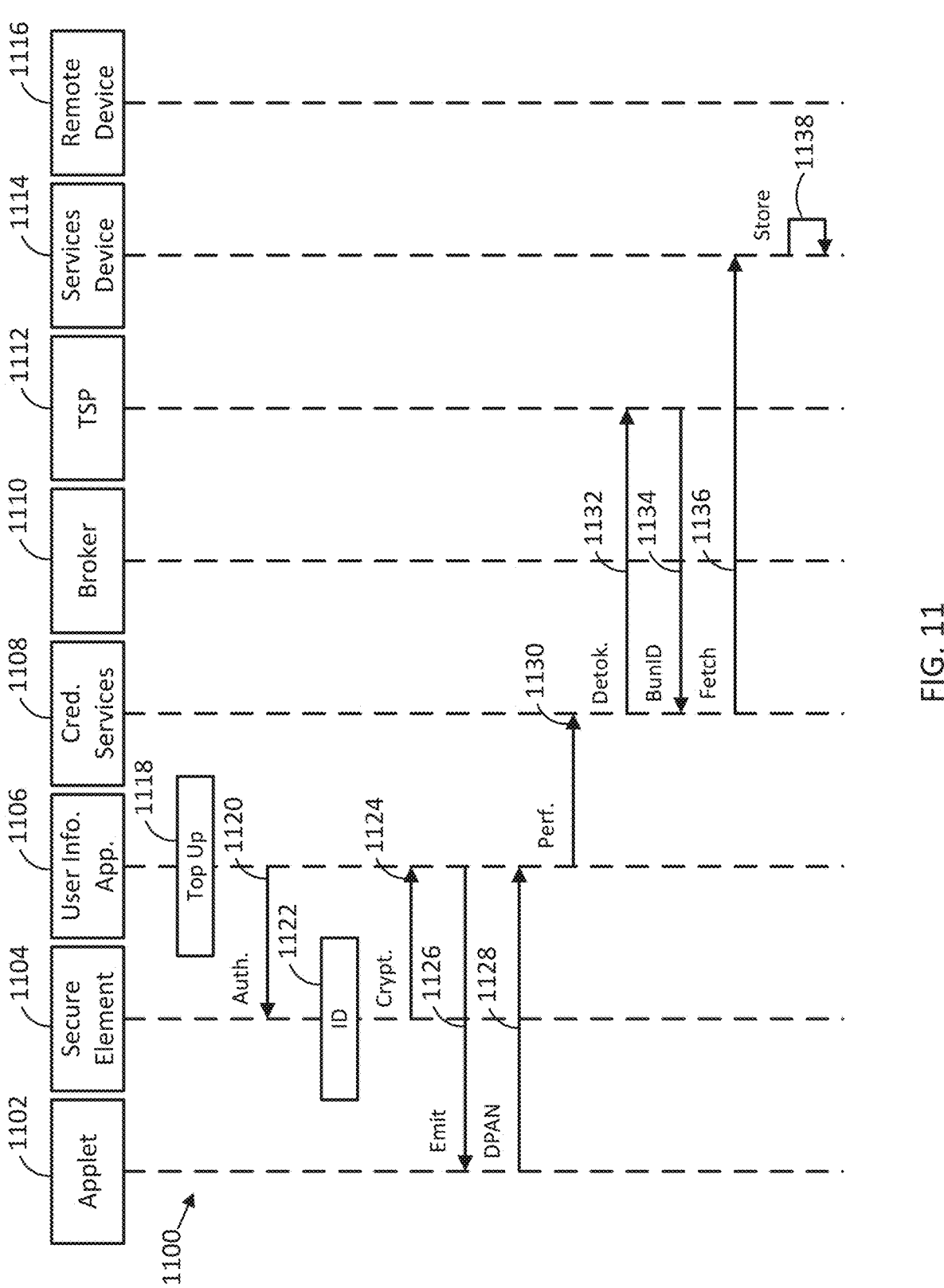
FIG. 11 illustrates a first portion of an example signal flow for topping up an account in accordance with some embodiments.

FIG. 11 illustrates a first portion of an example signal flow 1100 for topping up an account in accordance with some embodiments. For example, the signal flow 1100 may illustrate a procedure for adding value to an account associated with a credential stored in a user information application. For example, the credential may be associated with account having a value that may have the value reduced through each use of the credential. If the value of the credential reaches zero, or a reduction of the value would cause the value to be less than zero, the credential may no longer be utilized. The topping up of the account may include adding value to the account to allow the credential be used. It should be understood that one or more of the operations described in the signal flow 1100 may be performed concurrently and/or in a different order than illustrated. Additionally, one or more of the operations may be omitted in other embodiments.

The signal flow 1100 may occur between a plurality of entities. For example, the entities may include an applet 1102, a secure element 1104, a user information application 1106, credential services 1108, a broker 1110, a token service provider (TSP) 1112, a services device 1114, and a remote device 1116. The applet 1102 may include one or more of the features of the credential application 302 (FIG. 3). The secure element 1104 may include one or more of the features of the secure element 212 (FIG. 2) and/or the SEP 702 (FIG. 7). The user information application 1106 may include one or more of the features of the user information application 202 (FIG. 2), the user information application 304 (FIG. 3), the user information application 704 (FIG. 7), and/or the user information application 1002 (FIG. 10). The services device 1114 may include one or more of the features of the services device 308 (FIG. 3), the services device 708 (FIG. 7), and/or the services device 1006 (FIG. 10).

The credential services 1108 may comprise a device or a server that can facilitate data transfers of one or more of the credentials stored within the user information application 1106. For example, the credential services 1108 may facilitate the topping up of one or more accounts associated with one or more of the credentials stored within the user information application 1106.

The broker 1110 may comprise a device or a server that can assist in provisioning credentials to the device. In other embodiments, the broker 1110 may be omitted.

The TSP 1112 may comprise an entity that can map the QR codes described herein to a corresponding account. For example, the TSP 1112 may maintain mappings that can be utilized for mapping the QR codes to the corresponding account. The TSP 1112 may be able to identify the corresponding account based on the reception of a QR code, or information related to the QR code.

The remote device 1116 may include one or more of the features of the remote device 112 (FIG. 1). The remote device 1116 may be associated with the credential to be topped off. The credential on the user information application 1106 may be utilized for performance of data transfers with an account associated with the remote device. An account associated with the credential may have a stored value. The user information application 1106 may perform data transfers with the remote device 1116 that result in the value of the account associated with the credential to be reduced. The account associated with the credential may be topped off to prevent the value of the account from becoming negative, where the credential may not be able to perform a data transfer with the account associated with the remote device 1116 if it would cause the value of the account associated with the credential to become negative.

In 1118, the user information application 1106 may identify a top up request. For example, a user of a device on which the user information application 1106 is executed may perform a user interaction that indicates that the account associated with a credential is to be topped up. The user information application 1106 may detect the user interaction that indicates the account is to be topped up and may initiate a top up for the account based on the user interaction.

In 1120, the user information application 1106 may perform an authentication procedure. For example, the user information application 1106 may perform biometric authentication (such as face identification and/or fingerprint identification) for the user of the device. Performing the biometric authentication may include capturing biometric information for the user, such as an image of a face of the user and/or an image of a fingerprint of the user. The user information application 1106 may further provide the biometric information for performing the authentication of the user to the secure element 1104.

In 1122, the secure element 1104 may analyze the biometric information provided by the user information application 1106 in 1120. For example, the secure element 1104 may compare the biometric information with stored biometric information corresponding to a user associated with the credential to authenticate that the user is a user who is authorized to top off the account.

In 1124, the secure element 1104 may provide a host cryptogram to the user information application 1106. The host cryptogram may comprise binary data which could be a digital signature or message authentication code (MAC). The host cryptogram may act as an input to decrypt a single QR code.

In 1126, the user information application 1106 may provide an emit data transfer indication to the applet 1102. The data transfer indication may indicate an amount to be added to the account to top off the account. The data transfer indication may further include the host cryptogram. The user information application 1106 may transmit the emit data transfer indication to the applet 1102.

In 1128, the applet 1102 may provide a DPAN and the cryptogram to the user information application 1106. For example, the applet 1102 may generate a DPAN based on the emit data transfer indication received from the user information application 1106. The applet 1102 may store the DPAN in the secure element 1104. The DPAN may correspond to the credential within the user information application 1106 that is to have the corresponding account topped off.

In 1130, the user information application 1106 may provide a perform data transfer request to the credential services 1108. The perform data transfer request may indicate that a data transfer is be performed to add value to the account to top off the account. The perform data transfer request may include the DPAN and the cryptogram. The user information application 1106 may transmit the perform data transfer request to the credential services 1108 based on the reception of the DPAN and the cryptogram to credential services 1108.

In 1132, the credential services 1108 may request authorization the data transfer and/or detokenization of the DPAN by the TSP 1112. The request may include the DPAN, the cryptogram, and/or a value to be added to the account for the top off. The credential services 1108 may transmit the request for authorization of the data transfer and/or detokenization of the DPAN to the TSP 1112.

In 1134, the TSP 1112 may detokenize the DPAN. For example, the DPAN may have a certain size and format. The size and format of the DPAN may not be desirable for certain operations, such as for a provisioning bundle identifier. By detokenizing the DPAN, the size and/or format constraints may not be applicable to the detokenized result. The TSP 1112 may produce a provisioning bundle identifier (which may be referred to as a bundle identifier) based on the detokenizing of the DPAN. For example, the DPAN may be issued against the bundle identifier, where the bundle identifier may not have the same size and/or format constraints as the DPAN. The TSP 1112 may transmit the bundle identifier to the credential services 1108.

In 1136, the credential services 1108 may provide a fetch authorization token request to the services device 1114. The fetch authorization token request may request that the services device 1114 generate an authorization token corresponding to the account to be topped off. The fetch authorization token request may include the bundle identifier, a credential signature, an amount to be added to the account, a data transfer notification identifier, or some combination thereof. The credential services 1108 may transmit the fetch authorization token request to the services device 1114.

In 1138, the services device 1114 may generate a remote device authorization token. The remote device authorization token may be a single-use token. The remote device authorization token may be utilized for providing authorization for a data transfer between the account associated with the credential and an account associated with the remote device 1116. The services device 1114 may store the remote device authorization token.

Figure 12:
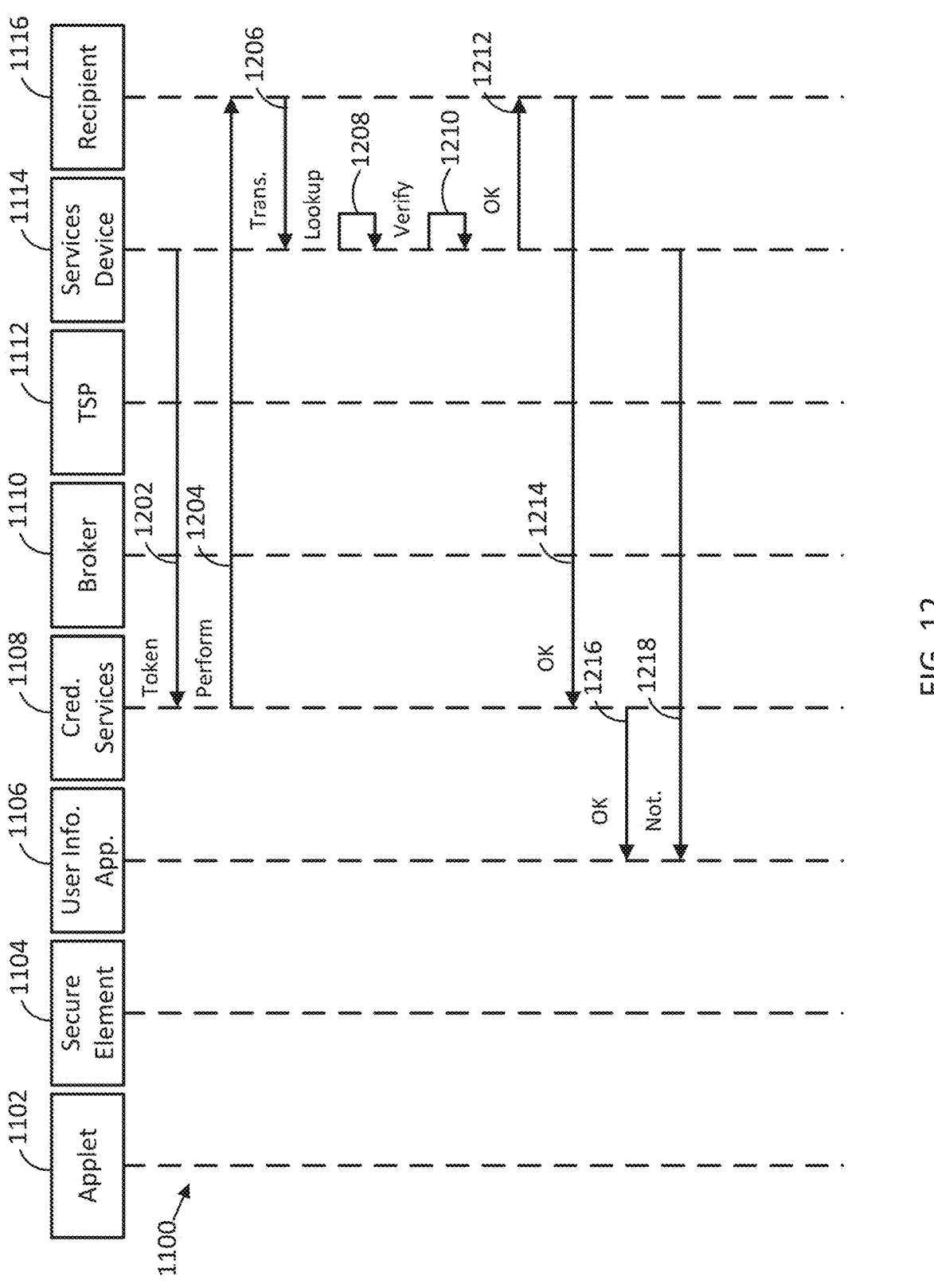
FIG. 12 illustrates a second portion of the signal flow of FIG. 11 for topping up an account in accordance with some embodiments.

FIG. 12 illustrates a second portion of the signal flow 1100 for topping up an account in accordance with some embodiments. In particular, the signal flow 1100 may proceed from 1138 to 1202.

In 1202, the services device 1114 may provide the remote device authorization token to the credential services 1108. For example, the services device 1114 may transmit the remote device authorization token generated in 1138 to the credential services 1108.

In 1204, the credential services 1108 may provide a data transfer request to the remote device 1116. The data transfer request may request that a data transfer be performed between the account associated with the credential and the account associated with the remote device 1116. The data transfer request may include the remote device authorization token. The credential services 1108 may transmit the data transfer request to the remote device 1116.

In 1206, the remote device 1116 may perform a data transfer with the services device 1114. For example, the remote device 1116 may transmit a request to perform a data transfer between the account associated with the credential (which may be maintained by the services device 1114) and the account associated with the remote device 1116. The indication may include data transfer information for the data transfer to be performed. The data transfer information may indicate an amount to be transferred between the accounts, a format of the value of the account associated with the remote device 1116, the remote device authorization token, or some combination thereof. The remote device 1116 may transmit the request to perform the data transfer to the services device 1114.

In 1208, the services device 1114 may perform a look up for the authorization token. For example, the services device 1114 may look up the authorization token to verify that the data transfer is authorized to be performed.

In 1210, the services device 1114 may verify the amount to be transferred in the data transfer. For example, the services device 1114 may compare the amount received in 1136 with the amount received in 1206 to determine if the amounts correspond. In some embodiments, the services device 1114 may determine whether the two amounts match and may continue the signal flow 1100 if the values match or terminate the signal flow 1100 if the values do not match. The services device 1114 may perform a data transfer with the account corresponding to the credential based on a determination that the amounts correspond. For example, the services device 1114 may decrease the value of the account associated with the credential by the amount.

In 1212, the services device 1114 may provide an indication to the remote device 1116 that the data transfer is to be performed. For example, the services device 1114 may transmit an OK message to the remote device 1116 to indicate that the data transfer is to be performed. Based on the indication from the services device 1114, the remote device may increase the value of the account associated with the remote device 1116 by the amount.

In 1214, the remote device 1116 may provide an indication to the credential services 1108 that the data transfer has been performed. For example, the remote device 1116 may transmit an OK message to the credential services 1108 that indicates the data transfer has been performed.

In 1216, the credential services 1108 may provide an indication to the user information application 1106 that the data transfer has been performed. For example, the credential services 1108 may transmit an OK message to the user information application 1106 that indicates that the data transfer has been performed.

In 1218, the services device 1114 may provide data transfer notification information to the user information application 1106. For example, the data transfer notification information may notify the user information application 1106 of the information associated with the data transfer. The data transfer notification information may include a data transfer notification identifier corresponding to the data transfer, an amount that has been transferred or a resulting value of the account associated with the credential, or some combination thereof.

Figure 13:
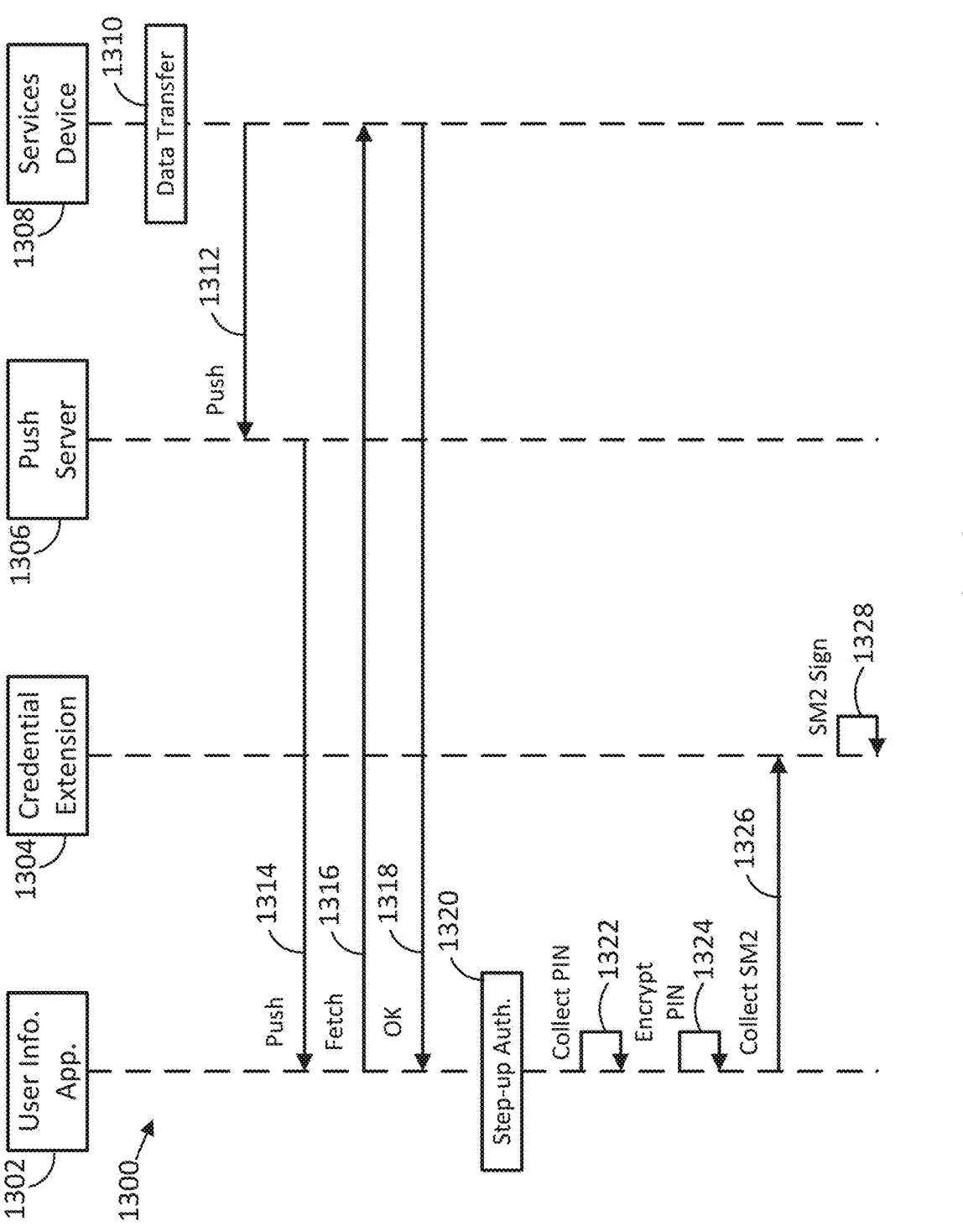
FIG. 13 illustrates a first portion of a signal flow for data transfer step-up authentication in accordance with some embodiments.

FIG. 13 illustrates a first portion of a signal flow 1300 for data transfer step-up authentication in accordance with some embodiments. For example, the signal flow 1300 may be performed based on other authentication procedures associated with a data transfer failing to provide adequate authentication of the data transfer. For example, the step-up authentication may be utilized when an expired QR code has been utilized for a data transfer, such as when the device is unable to establish a connection with a QR provision server or a services device to retrieve additional QR codes. The step-up authentication may be utilized to authenticate the data transfer to verify that the data transfer is to be performed. It should be understood that one or more of the operations described in the signal flow 1300 may be performed concurrently and/or in a different order than illustrated. Additionally, one or more of the operations may be omitted in other embodiments.

The signal flow 1300 may occur between a plurality of entities. For example, the entities may include a user information application 1302, a credential extension 1304, a push server 1306, and a services device 1308 in the illustrated embodiment. The user information application 1302 may include one or more of the features of the user information application 202 (FIG. 2), the user information application 304 (FIG. 3), the user information application 704 (FIG. 7), the user information application 1002 (FIG. 10), and/or the user information application 1106 (FIG. 11). The credential extension 1304 may include one or more of the features of the credential extension 204 (FIG. 2) and/or the credential extension 1004 (FIG. 10). The services device 1308 may include one or more of the features of the services device 308 (FIG. 3), the services device 708 (FIG. 7), the services device 1006 (FIG. 10), and/or the services device 1114 (FIG. 11).

The push server 1306 may comprise a server that can cause one or more devices (such as the device on which the user information application 1302 is executed and on which the credential extension 1304 is being executed) to perform a push. For example, the push server 1306 may transmit a push notification to one or more devices that cause the device to display a message and/or an image on the display of the device in response to receiving the push notification from the push server 1306. In other instances, the push notification transmitted by the push server 1306 may cause one or more devices to perform one or more operations associated with the push notification In 1310, the services device 1308 may receive a request for a data transfer. For example, the services device 1308 may receive a request of a data transfer to be performed with an account maintained by the services device 1308.

In 1312, the services device 1308 may transmit a push notification request to the push server 1306. The push notification request may direct the push server 1306 to retrieve information for a data transfer for which a step-up authentication procedure may be performed.

In 1314, the push server 1306 may transmit a push notification to the user information application 1302. The push notification may cause the user information application 1302 to retrieve the information for the data transfer.

In 1316, the user information application 1302 may transmit a fetch data transfer information request to the services device 1308. The fetch data transfer information request may include an authentication token associated with the data transfer. The fetch data transfer information request may request data transfer details from the services device 1308.

In 1318, the services device 1308 may transmit a message to the user information application 1302 that includes data transfer details. The data transfer details may include a data transfer status, a pending QR code identifier, authentications details, or some combination thereof.

In 1320, the user information application 1302 may initiate a step-up authentication operation. For example, the user information application 1302 may initiate a step-up authentication operation based on the services device 1308 indicating that further authentication is to utilized for the data transfer.

In 1322, the user information application 1302 may collect a personal identification number (PIN) for a user of the device. For example, the user information application 1302 may cause a user interface to be displayed on a display of the device executing the user information application 1302, where the user interface requests that the user input a PIN. The user information application 1302 may identify the PIN input by the user.

In 1324, the user information application 1302 may encrypt the PIN. For example, the user information application 1302 may encrypt the PIN identified in 1322. The user information application 1302 may encrypt the PIN based on a device encryption certificate and/or an ephemeral public key.

In 1326, the user information application 1302 may transmit an SM2 collection request to the credential extension 1304. The SM2 collection request may request that the credential extension 1304 provide a SM2 signature corresponding to the data transfer. The SM2 collection request may include the data transfer details received in 1318.

In 1328, the credential extension 1304 may generate an SM2 signature. For example, the credential extension 1304 may generate an SM2 signature for the data transfer based on the data transfer details. The SM2 signature may be issued over the data transfer details.

Figure 14:
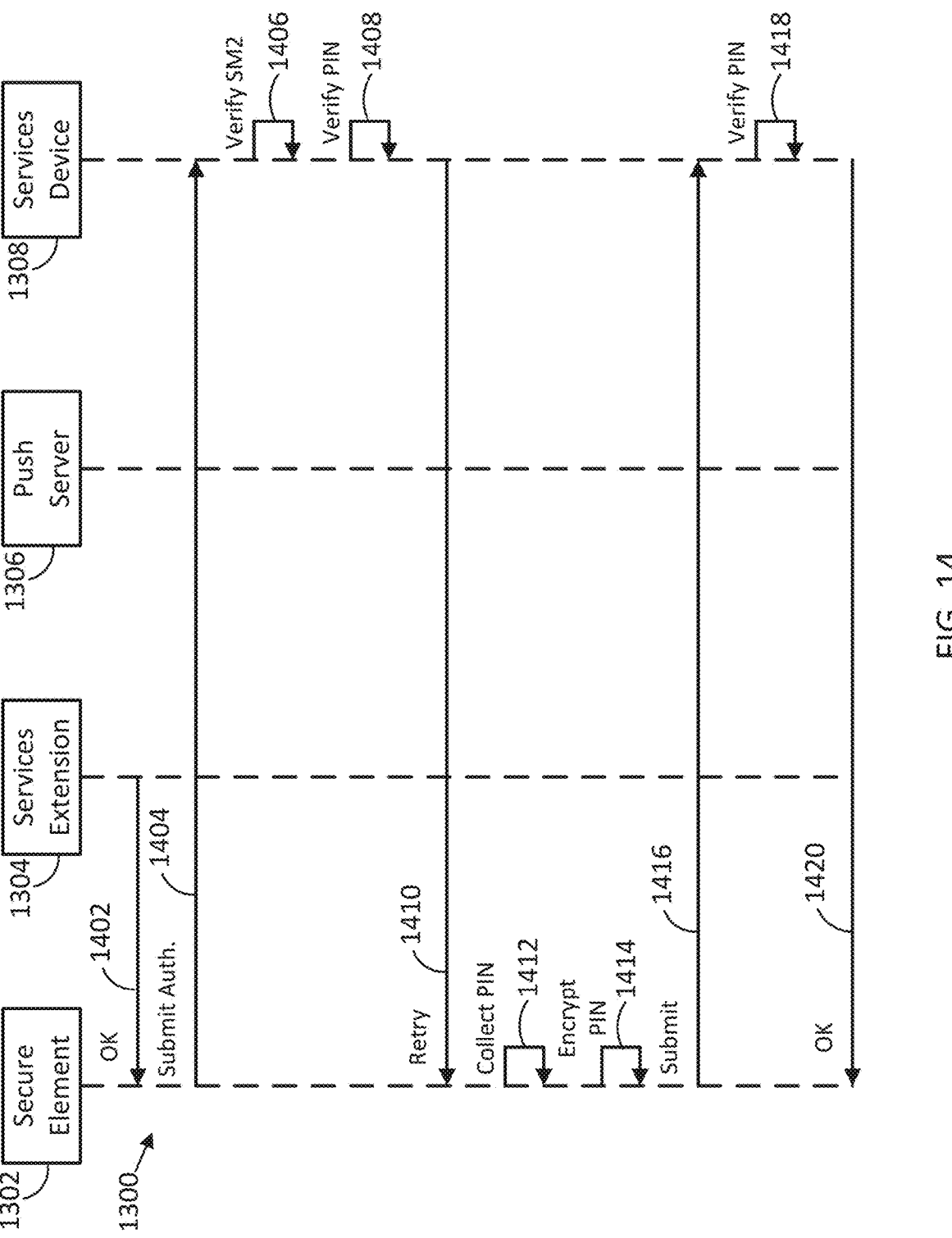
FIG. 14 illustrates a second portion of the signal flow of FIG. 13 for data transfer step-up authentication in accordance with some embodiments.

FIG. 14 illustrates a second portion of the signal flow 1300 for data transfer step-up authentication in accordance with some embodiments. In particular, the signal flow 1300 may proceed from 1328 to 1402.

In 1402, the credential extension 1304 may provide the SM2 signature to the user information application 1302. For example, the credential extension 1304 may transmit the SM2 signature generated in 1328 to the user information application 1302. The SM2 signature may be issued over the data transfer details.

In 1404, the user information application 1302 may submit authentication results information to the services device 1308. The authentication results information submitted may include a data transfer identifier corresponding to the data transfer and/or authentication results. The authentication results may include the encrypted pin and/or the SM2 signature over the data transfer details. The user information application 1302 may transmit the authentication results information to the services device 1308.

In 1406, the services device 1308 may verify the SM2 signature. For example, the service device 1308 may verify the SM2 signature received in 1404. The services device 1308 may compare the SM2 signature received in 1404 with a stored SM2 signature corresponding to a user authorized to perform the data transfer to determine that the data transfer is authorized to be performed.

In 1408, the services device 1308 may verify the PIN. For example, the services device 1308 may verify the PIN received in 1404. The services device 1308 may decrypt the encrypted PIN received in 1404. The services device 1308 may compare the PIN with a stored PIN corresponding to the user authorized to the perform the data transfer to determine that the data transfer is authorized to be performed.

If both the SM2 signature verification of 1406 and the PIN verification of 1408 are successful, the services device 1308 may transmit an indication to the user information application 1302 that the data transfer is authorized. If either of the SM2 signature verification of 1406 or the PIN verification of 1408 fail, the signal flow 1300 may perform additional authentication operations and/or transmit an indication to the user information application that the data transfer is not authorized. In the illustrated embodiment, the PIN verification has failed and an additional authentication operation is performed for the PIN.

In 1410, the services device 1308 may transmit an authentication mechanism retry request to the user information application. The authentication mechanism retry request may include an authentication mechanism to be performed and/or a reason why the authentication mechanism is to be performed. In the illustrated embodiment, the authentication mechanism to be performed may be a PIN collection and the reason provided may be that the PIN verification, as performed in 1408, had failed.

In 1412, the user information application 1302 may collect a PIN for a user of the device. For example, the user information application 1302 may cause a user interface to be displayed on a display of the device executing the user information application 1302, where the user interface requests that the user input a PIN. The user information application 1302 may identify the PIN input by the user.

In 1414, the user information application 1302 may encrypt the PIN. For example, the user information application 1302 may encrypt the PIN identified in 1412. The user information application 1302 may encrypt the PIN based on a device encryption certificate and/or an ephemeral public key.

In 1416, the user information application 1302 may submit authentication results information to the services device 1308. The authentication results information submitted may include the data transfer identifier corresponding to the data transfer and/or authentication results. The authentication results may include the encrypted pin. The user information application 1302 may transmit the authentication results information to the services device 1308.

In 1418, the services device 1308 may verify the PIN. For example, the services device 1308 may verify the PIN received in 1416. The services device 1308 may decrypt the encrypted PIN received in 1416. The services device 1308 may compare the PIN with a stored PIN corresponding to the user authorized to the perform the data transfer to determine that the data transfer is authorized to be performed. In the illustrated embodiment, the services device 1308 may determine that the PIN verification is successful this time.

In 1420, the services device 1308 may transmit an indication to the user information application 1302 that the data transfer is to be performed. For example, the services device 1308 may transmit the indication that the data transfer is to be performed based on the SM2 signature verification being successful in 1406 and the PIN verification being successful in 1416. While SM2 signature verification and PIN verification are illustrated being utilized for step-up authentication, it should be understood that either the SM2 signature verification or the PIN verification may be solely implemented in other embodiments. Further, different authentication approaches may be utilized in other embodiments, such as requesting user confirmation of the data transfer and/or redirecting the user to a credential application (such as the credential application 206 (FIG. 2) and/or the credential application 302 (FIG. 3)).

FIG. 15 illustrates a first portion of an example procedure 1500 for display of a QR code for a data transfer in accordance with some embodiments. The procedure 1500 may be performed by a device, such as the device 102 (FIG. 1) and/or the device 200 (FIG. 2). The order in which the operations of procedure 1500 (or any procedure described herein) are described is not intended to be construed as a limitation, and any number of the described operations can be combined in any order and/or in parallel to implement the described process(es).

In 1502, the device may determine that QR codes have been stored for longer than a time threshold. For example, the device may determine that one or more QR codes (such as the QR codes 210 (FIG. 2) stored in the memory 208 (FIG. 2)) stored on the device have been stored for longer than a time threshold. The time threshold may be predefined, such as the time thresholds described throughout the disclosure. In some embodiments, 1502 may be omitted.

In 1504, the device may remove the QR codes. For example, the device may remove the one or more QR codes determined in 1502 from the device. The device may remove the one or more QR codes based at least in part on the one or more QR codes having been stored for longer than the time threshold. In some embodiments, 1504 may be omitted.

In 1506, the device may determine that a number of QR codes is less than a threshold. For example, the device may determine that a number of QR codes stored on the device is less than a threshold number of QR codes. The threshold number of QR codes may define a minimum number of QR codes to be stored on the device. The threshold number of QR codes may be determined in accordance with the approaches for determining the threshold number of QR codes described throughout this disclosure. In some embodiments, 1506 may be omitted.

In 1508, the device may determine that the device does not have connectivity. For example, the device may determine that the device does not have connectivity with a QR provision device (such as the QR provision device 108 (FIG. 1)). Due to the device not having connectivity with the QR provision device, the device may be unable to request additional QR codes. In some embodiments, 1508 may be omitted.

In 1510, the device may maintain storage of the QR codes. For example, the device may maintain storage of the one or more QR codes determined in 1502. The device may maintain the storage of the one or more QR codes based at least in part on the determination that the device does not have connectivity with the QR provision device in 1508. The device may maintain the storage of the one or more QR codes at least until the device has connectivity with the QR provision device. Once the device has established connectivity with the QR provision device, the device may request additional QR codes from the QR provision device and/or remove the one or more QR codes. In some embodiments, 1510 may be omitted.

In 1512, the device may request a plurality of QR codes. For example, the device may request that a plurality of QR codes be provided by the QR provision device. The QR provision device may provide the plurality of QR codes based at least in part on the plurality of QR response codes being requested. In some embodiments, the device may request the plurality of QR codes based at least in part on the one or more QR codes having been stored for longer than a time threshold, which may have been determined in 1502. In some embodiments, 1512 may be omitted.

In 1514, the device may indicate an amount of QR codes. For example, the device may indicate an amount of QR codes to be included in the plurality of QR codes to be provided by the QR provision device. The amount of QR codes to be provided by the QR provision device may be determined in accordance with any of the approaches for determining an amount of QR codes to be provided as described throughout the disclosure. In some embodiments, 1514 may be omitted.

In 1516, the device may receive the plurality of QR codes. For example, the device may receive a plurality of QR codes associated with an account. The device may receive the plurality of QR codes from the QR provision device. Each of the plurality of QR response codes may be individually encrypted as described throughout the disclosure, such that a single QR code of the plurality of QR codes is configured to be decrypted at a time.

In 1518, the device may receive a request to display a QR code. For example, the device may receive a request to display a QR code of the plurality of QR codes. The display of the QR code may be configured to enable initiation of a data transfer.

In 1520, the device may perform an authorization operation. For example, the device may perform an authorization operation for authorization for the account based at least in part on the request to display the QR code. The authorization operation may include performing an authentication operation for a user of the device in accordance with approaches for performing an authentication operation (such as through biometric information) for a user as described throughout the disclosure in some embodiments. The authentication operation may verify that the user is a user that is authorized for performing a data transfer with the account.

Figure 16:
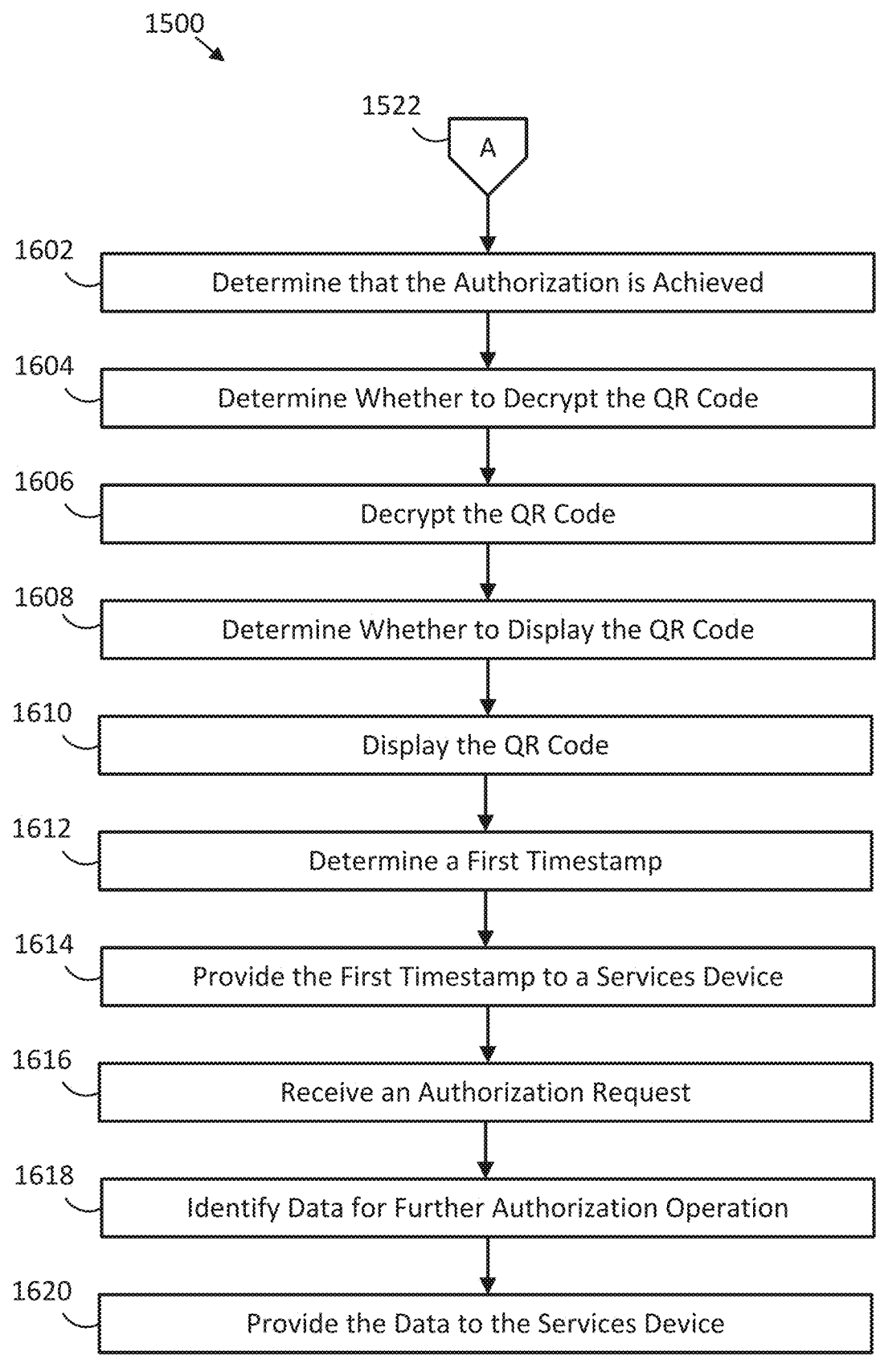
FIG. 16 illustrates a second portion of the example procedure of FIG. 15 for display of a QR code for a data transfer in accordance with some embodiments.

FIG. 16 illustrates a second portion of the example procedure 1500 for display of a QR code for a data transfer in accordance with some embodiments. The procedure 1500 may proceed from 1522 illustrated in FIGS. 15 to 1522 illustrated in FIG. 16.

In 1602, the device may determine that the authorization is achieved. For example, the device may determine that the authorization is achieved for the account. The device may determine that the authorization is achieved based on the authorization operation of 1520. In some embodiments, 1602 may be omitted, such as when the authorization operation of 1520 has failed.

In 1604, the device may determine whether to decrypt the QR code. For example, the device may determine whether to decrypt the QR code based at least in part on the authorization for the account from 1602.

In 1606, the device may decrypt the QR code. For example, the device may determine to decrypt the QR code based at least in part on the authorization being achieved for the account. In some embodiments, the QR code may be decrypted with a key stored on a secure element (such as the keys 214 (FIG. 2) stored on the secure element 212 (FIG. 2)) of the device. The plurality of QR codes may be stored separate from the secure element. In some embodiments, 1606 may be omitted.

In 1608, the device may determine whether to display the QR code. For example, the device may determine whether to display the QR code on a display of the device based at least in part on whether the quick response code is determined to be decrypted.

In 1610, the device may display the QR code. For example, the device may display the QR code (such as the QR code 104 (FIG. 1)) on the display of the device. The device may display the QR code based at least in part on determining to display the QR code in 1608. A remote device may be configured to scan the QR code and to initiate the data transfer. In some embodiments, 1610 may be omitted, such as when it is determined not to display the QR code in 1608.

In 1612, the device may determine a first timestamp. For example, the device may determine a first timestamp that indicates a first time that the QR code is first displayed on the display of the device. In some embodiments, 1612 may be omitted.

In 1614, the device may provide the first timestamp to a services device. For example, the device may transmit the first timestamp to a services device, where the services device is configured to compare the first timestamp with a second timestamp that indicates a second time that the QR code is scanned to determine whether the QR code has been used within an allowed time period. In some embodiments, 1614 may be omitted.

In 1616, the device may receive an authorization request. For example, the device may receive an authorization request for a further authorization operation for the data transfer received from the services device. In some embodiments, the further authorization operation may include a step-up authentication as described throughout the disclosure. In some embodiments, 1616 may be omitted.

In 1618, the device may identify data for the further authorization operation. The data to be identified may be defined by the services device in some embodiments. In some embodiments, 1618 may be omitted.

In 1620, the device may provide the data to the services device. For example, the device may provide the data for the further authorization to the services device, where the data for the further authorization operation may be configured to be utilized for determining authority to complete the data transfer. In some embodiments, 1620 may be omitted.

Figure 17:
FIG. 17 illustrates a first portion of another example procedure for display of a QR code for a data transfer in accordance with some embodiments.

FIG. 17 illustrates a first portion of another example procedure 1700 for display of a QR code for a data transfer in accordance with some embodiments. The procedure 1700 may be performed by a device, such as the device 102 (FIG. 1) and/or the device 200 (FIG. 2). The order in which the operations of procedure 1700 (or any procedure described herein) are described is not intended to be construed as a limitation, and any number of the described operations can be combined in any order and/or in parallel to implement the described process(es).

In 1702, the device may determine that a number of QR codes is less than a threshold number. For example, the device may determine that a number of QR codes stored in memory of the device is less than a threshold number of QR codes. The threshold number of QR codes may be a minimum number of QR codes to be stored in the memory. The threshold number of QR codes may be defined in accordance with the approaches for defining the threshold number of QR codes described throughout the disclosure. In some embodiments, 1702 may be omitted.

In 1704, the device may provide a request. For example, the device may provide a request to a quick response provision device associated with the plurality of QR codes to provide additional QR codes based at least in part on the number of QR codes being less than the threshold number of QR codes. In some embodiments, 1704 may be omitted.

In 1706, the device may indicate a number of additional QR codes. For example, the device may indicate a number of the additional QR codes to be provided by a QR provision device. In some embodiments, 1706 may be omitted.

In 1708, the device may determine that a portion of QR codes have been stored for longer than a time threshold. For example, the device may determine that a portion of the plurality of QR codes have been stored for longer than a time threshold. The time threshold may be defined in accordance with any of the approaches for defining a time threshold described throughout the disclosure. In some embodiments, 1708 may be omitted.

In 1710, the device may remove the portion of the QR codes. For example, the device may remove the portion of the plurality of QR codes from the memory based at least in part on the determination that the portion of the plurality of QR codes have been stored for longer than the time threshold. In some embodiments, 1710 may be omitted.

In 1712, the device may receive an authorization request. For example, the device may receive an authorization request to display a QR of the plurality of QR codes. The display of the QR code may be configured to enable initiation of a data transfer associated with an account.

In 1714, the device may perform an authorization operation. For example, the device may perform an authorization operation for authorization for the account. In some embodiments, the authorization operation may include performing authentication (such as biometric authentication) to verify that a user of the device is a user that authorized to perform a data transfer with the account. The authorization operation may further include determining that the user of the device is authorized to perform a data transfer based on the authentication of the user.

In 1716, the device may decrypt the QR code. For example, the device may decrypt the QR code based at least in part on the authorization being achieved for the account in 1714. The authorization may be achieved by determining that the user is authorized to perform a data transfer. The device may be limited to decryption of a single QR code at a time based at least in part on the plurality of QR codes being individually encrypted. In some embodiments, the decryption of the QR code may include decrypting the QR code with a key stored on a secure element of the device (such as the keys 214 (FIG. 2) stored on the secure element 212 (FIG. 2)), where the plurality of QR codes are stored separate from the secure element.

In 1718, the device may display the decrypted QR code. For example, the device may display the decrypted QR code from 1716 on a display of the device. The QR code may be configured to be scanned by a remote device for initiation of the data transfer.

FIG. 18 illustrates a second portion of the example procedure 1700 for display of a QR code for a data transfer in accordance with some embodiments. The procedure 1700 may proceed from 1720 illustrated in FIGS. 17 to 1720 illustrated in FIG. 18.

In 1802, the device may determine a first timestamp. For example, the device may determine a first timestamp that indicates a first time at which the decrypted QR response is initially displayed on the display of the device, such as the display of the QR code in 1718. In some embodiments, 1802 may be omitted.

In 1804, the device may provide the first timestamp to a services device. For example, the device may provide the first timestamp to a services device associated with the plurality of QR codes. The services device may be configured to compare the first timestamp with a second timestamp that indicates a second time that the QR code is scanned to determine whether the QR code has been used within an allowed time period. The allowed time period may be defined in accordance with any of the approaches for defining an allowed time period described throughout this disclosure. In some embodiments, the allowed time period may be three minutes. In some embodiments 1804 may be omitted.

In 1806, the device may receive a request for a further authorization operation. For example, the device may receive a request for a further authorization operation for the data transfer received from a services device associated with the plurality of QR codes. In some embodiments, the further authorization operation may include a step-up authentication as described throughout the disclosure. In some embodiments, 1806 may be omitted.

In 1808, the device may identify data for the further authorization operation. The data to be identified may be defined by the services device in some embodiments. In some embodiments, 1808 may be omitted.

In 1810, the device may provide the data to the services device. For example, the device may provide the data identified in 1808 for the further authorization operation to the services device. The data for the further authorization operation may be configured to be utilized for determining authority to complete the data transfer. In some embodiments, 1810 may be omitted.

FIG. 19 illustrates an example procedure 1900 for display of a QR code for a data transfer in accordance with some embodiments. The procedure 1900 may be performed by a device, such as the device 102 (FIG. 1) and/or the device 200 (FIG. 2). The order in which the operations of procedure 1900 (or any procedure described herein) are described is not intended to be construed as a limitation, and any number of the described operations can be combined in any order and/or in parallel to implement the described process(es).

In 1902, the device may receive a request to display a QR code. For example, the device may receive a request to display a QR code to be utilized for initiation of the data transfer.

In 1904, the device may perform an authorization operation. For example, the device may perform an authorization operation for authorization to utilize the QR code. The authorization operation may include performing an authentication operation (such as biometric authentication) to determine that a user of the device is a user that is authorized to utilize the QR code.

In 1906, the device may decrypt the QR code. For example, the device may decrypt the QR code from a plurality of QR codes stored on the device based at least in part on the authorization operation. The device may be unable to decrypt other QR codes from the plurality of QR codes based at least in part on the authorization operation due to the plurality of QR codes being individual encrypted.

In 1908, the device may display the QR code. For example, the device may display the QR code (such as the QR code 104 (FIG. 1)) on a display of the device. The QR code may be scanned to initiate a data transfer.

In 1910, the device may prevent the QR code from being displayed a second time. For example, the device may prevent the QR code from being displayed a second time on the display of the device. In particular, the QR code may be a single-use QR code, where the device may prevent the QR code from being displayed again after the first time the QR code is displayed. In some embodiments, 1910 may be omitted.

In 1912, the device may determine that a number of valid QR codes is less than a threshold number. For example, the device may determine that a number of valid QR codes of the plurality of QR codes stored on the device is less than a threshold number of QR codes. Whether a QR code is valid or invalid may be determined in accordance with approaches for determining validity as described throughout the disclosure. Further, the threshold number of QR codes may be a minimum number of QR codes to be stored by the device and the threshold number of QR codes may be defined in accordance with any approaches for defining a threshold number of QR codes as described throughout the disclosure. In some embodiments, 1912 may be omitted.

In 1914, the device may request additional QR codes. For example, the device may request additional QR codes from a QR provision device based at least in part on the number of valid QR codes being less than the threshold number of QR codes. In some embodiments, 1914 may be omitted.

In 1916, the device may determine that QR codes have been stored for longer than a time threshold. For example, the device may determine that one or more of the plurality of QR codes has been stored on the device for longer than a time threshold. The time threshold may be defined in accordance with any approach for defining a time threshold as described throughout the disclosure. In some embodiments, 1916 may be omitted.

In 1918, the device may remove the QR codes from storage. For example, the device may remove the one or more of the QR codes determined in 1916 from storage on the device based at least in part on the determining that the one or more of the QR codes has been stored on the device for longer than the time threshold. In some embodiments, 1918 may be omitted.

FIG. 20 illustrates a first portion of an example procedure 2000 for execution of a credential extension on a device to collect information in accordance with some embodiments. The procedure 2000 may be performed by a device, such as the device 102 (FIG. 1) and/or the device 200 (FIG. 2). The credential extension executed on the device may include one or more of the features of the credential extension 204 (FIG. 2) and/or the credential extension 1004 (FIG. 10). The order in which the operations of procedure 2000 (or any procedure described herein) are described is not intended to be construed as a limitation, and any number of the described operations can be combined in any order and/or in parallel to implement the described process(es).

In 2002, the device may detect indication of information to be collected. For example, the device may detect an indication of information to be collected by the credential extension received from a services device. The credential extension may be to collect the information based at least in part on the indication from the service device. In some embodiments, 2002 may be omitted.

In 2004, the device may detect a user indication of acceptable information. For example, the device may detect a user indication of acceptable information for collection during a data transfer. Information collected by the credential extension may be limited by the acceptable information. In some embodiments, 2004 may be omitted.

In 2006, the device may detect an indication of security procedures. For example, the device may detect an indication of security procedures received from the services device for security of information collected by the credential extension. In some embodiments, 2006 may be omitted.

In 2008, the device may detect a selection of a credential. For example, the device may detect a selection of a credential within a user information application being executed on the device. The credential may be utilized for performance of a data transfer. A user of the device may select the credential to be utilized for performance of the data transfer.

In 2010, the device may display a QR code. For example, the device may display the QR code on a display of the device. The QR code may be scanned by a remote device to initiate the data transfer. Information collected by the credential extension may be related to the display of the QR code. In some embodiments, 2010 may be omitted.

In 2012, the device may execute the credential extension. For example, the device may execute the credential extension within the user information application executed on the device. The credential extension may be to collect information authorization of the data transfer. The credential extension may be sandboxed within the user information application, where the sandboxing of the credential extension may be configured to limit privileges of the credential extension to authorized operations within the user information application.

In 2014, the device may display an indication that the credential extension is being executed. For example, the device may display, on the display of the device, an indication that the credential extension is being executed to collect the information based at least in part on the execution of the credential extension. In some embodiments, the indication may include an indication that collection of information is in progress, such as the indication 106 (FIG. 1). In some embodiments, 2014 may be omitted.

In 2016, the device may collect information related to the data transfer. For example, the credential extension being executed on the device may collect information related to the data transfer for authorization of the data transfer. The information collected by the credential extension may be defined based on the indication detected in 2002 and/or the user indication detected in 2004.

In 2018, the device may generate a bundle. For example, the credential extension being executed on the device may generate a bundle with the information collected by the credential extension in 2016 through application of the security procedures indicated in 2006. The security procedures may cause the data within the bundle to be inaccessible by the user information application. In some embodiments, the application of the security procedures may include encryption of the bundle. In some embodiments, 2018 may be omitted.

In 2020, the device may provide the information to the services device. For example, the credential extension executed on the device may provide the information collected by the credential extension to the services device corresponding to the credential for authorization of the data transfer.

Figure 21:
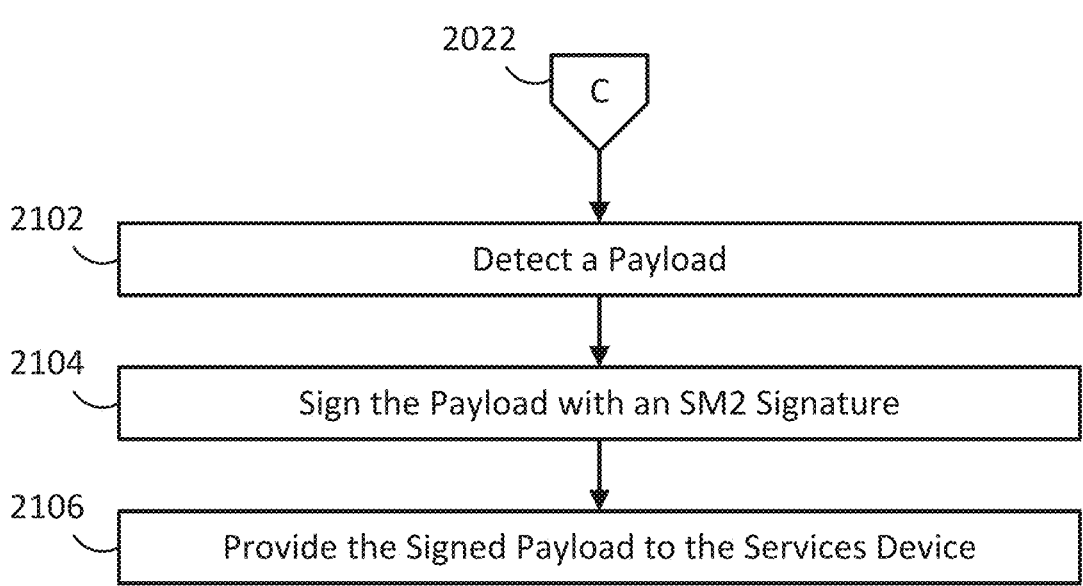
FIG. 21 illustrates a second portion of the example procedure of FIG. 20 for execution of a credential extension on a device to collect information in accordance with some embodiments.

FIG. 21 illustrates a second portion of the example procedure 2000 for execution of a credential extension on a device to collect information in accordance with some embodiments. The procedure 2000 may proceed from 2022 illustrated in FIGS. 20 to 2022 illustrated in FIG. 21.

In 2102, the device may detect a payload. For example, the credential extension executed on the device may detect a payload associated with the data transfer. The payload may include information collected for a step-authorization procedure in accordance with some of the approaches described throughout the disclosure. In some embodiments, 2102 may be omitted.

In 2104, the device may sign the payload with an SM2 signature. For example, the credential extension executed on the device may sign the payload detected in 2102 with an SM2 signature. In some embodiments, 2104 may be omitted.

In 2106, the device may provide the signed payload to the services device. For example, the credential extension executed on the device may provide the signed payload to the services device for authorization. In some embodiments, 2106 may be omitted.

Figure 22:
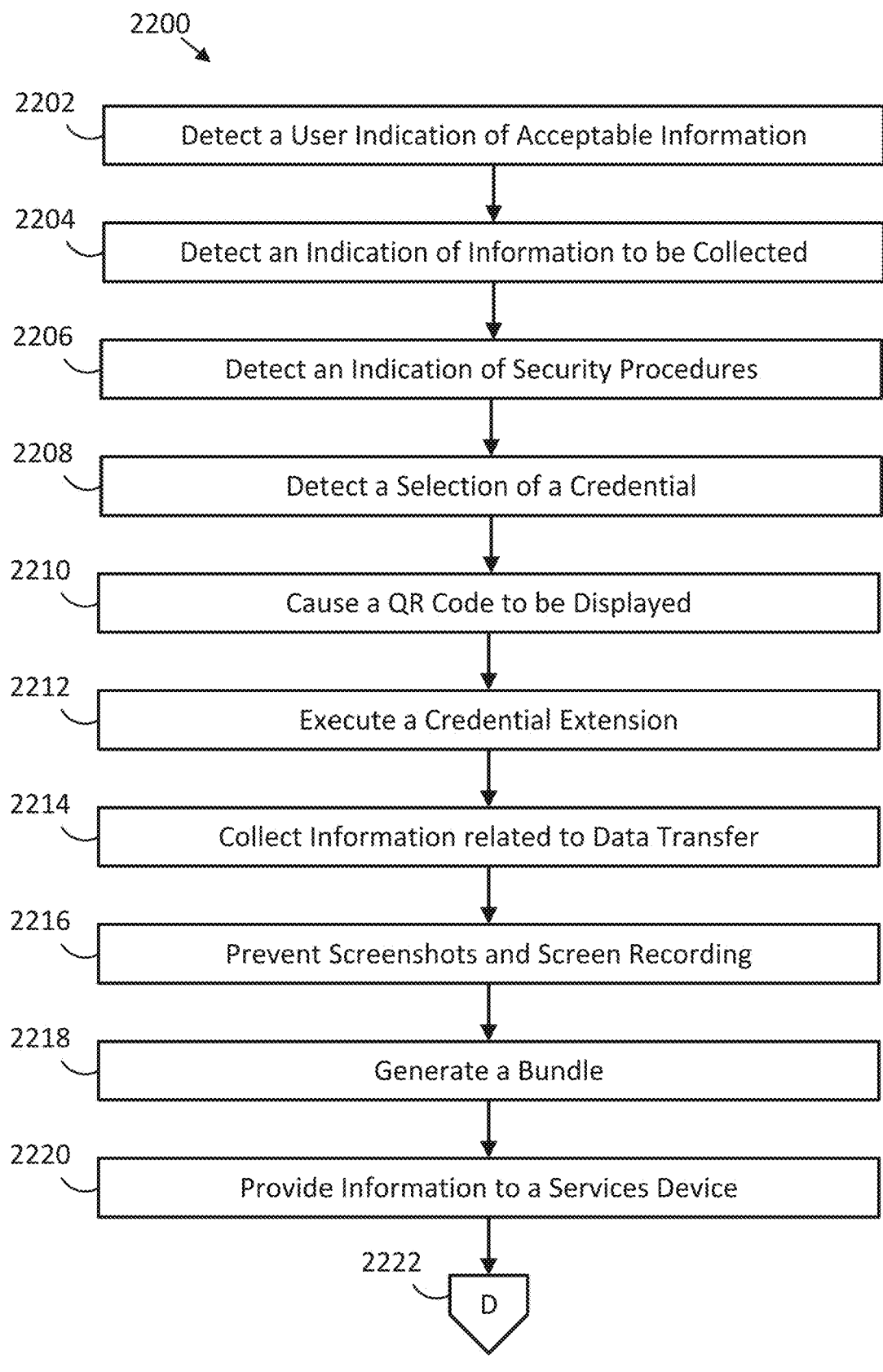
FIG. 22 illustrates a first portion of another example procedure for execution of a credential extension on a device to collect information in accordance with some embodiments.

FIG. 22 illustrates a first portion of another example procedure 2200 for execution of a credential extension on a device to collect information in accordance with some embodiments. The procedure 2200 may be performed by a device, such as the device 102 (FIG. 1) and/or the device 200 (FIG. 2). The credential extension executed on the device may include one or more of the features of the credential extension 204 (FIG. 2) and/or the credential extension 1004 (FIG. 10). The order in which the operations of procedure 2200 (or any procedure described herein) are described is not intended to be construed as a limitation, and any number of the described operations can be combined in any order and/or in parallel to implement the described process(es).

In 2202, the device may detect a user indication of acceptable information. For example, the device may detect a user indication of acceptable information for collection during a data transfer. The information collected by the credential extension during the data transfer may be limited by the acceptable information. In some embodiments, 2202 may be omitted.

In 2204, the device may detect an indication of information to be collected. For example, the device may detect an indication of information to be collected by the credential extension. The indication may be received from a services device. The credential extension may be to collect information based at least in part on the indication from the services device. In some embodiments, 2204 may be omitted.

In 2206, the device may detect an indication of security procedures. For example, the device may detect an indication of security procedures received from the services device for security of information collected by the credential extension. In some embodiments, 2206 may be omitted.

In 2208, the device may detect a selection of a credential. For example, the device may detect a selection of a credential, of one or more credentials, within a user information application. The credential may be utilized for performance of a data transfer. For example, a user of the device may select a credential of one or more credentials maintained by a user information application executed by the device.

In 2210, the device may cause a QR code to be displayed. For example, the device may cause a QR code (such as the QR code 104 (FIG. 1)) to be displayed on a display of the device. The QR code may be scanned by a remote device to initiate a data transfer. In some embodiments, information collected by the credential extension may be related to the display of the QR code. In some embodiments, 2210 may be omitted.

In 2212, the device may execute the credential extension. For example, the device may execute the credential extension within the user information application being executed on the device. The credential extension may collect information for authorization of the data transfer. The credential extension may be sandboxed within the user information application, which may limit privileges of the credential extension to authorized operations within the user information application.

In 2214, the device may collect information related to the data transfer. For example, the credential extension executed by the device may collect information related to the data transfer for authorization of the data transfer. In some embodiments, the information collected by the credential extension may be defined based on the indication of information to be collected in 2204 and/or the user of indication of acceptable information in 2202.

In 2216, the device may prevent screenshots and screen recording. For example, the credential extension executed by the device may prevent screenshots and screen recordings by the device while the QR code is displayed. In some embodiments, 2216 may be omitted.

In 2218, the device may generate a bundle. For example, the credential extension executed by the device may generate a bundle with the information collected by the credential extension through application of security procedures, such as the security procedures indicated in 2206. The security procedures may cause data within the bundle to be inaccessible by the user information application executed by the device. In some embodiments, the application of the security procedures may include encryption of the bundle. In some embodiments, 2218 may be omitted.

In 2220, the device may provide information to the services device. For example, the credential extension executed by the device may provide the information collected by the credential extension to the services device corresponding to the credential selected in 2208 for authorization of the data transfer.

Figure 23:
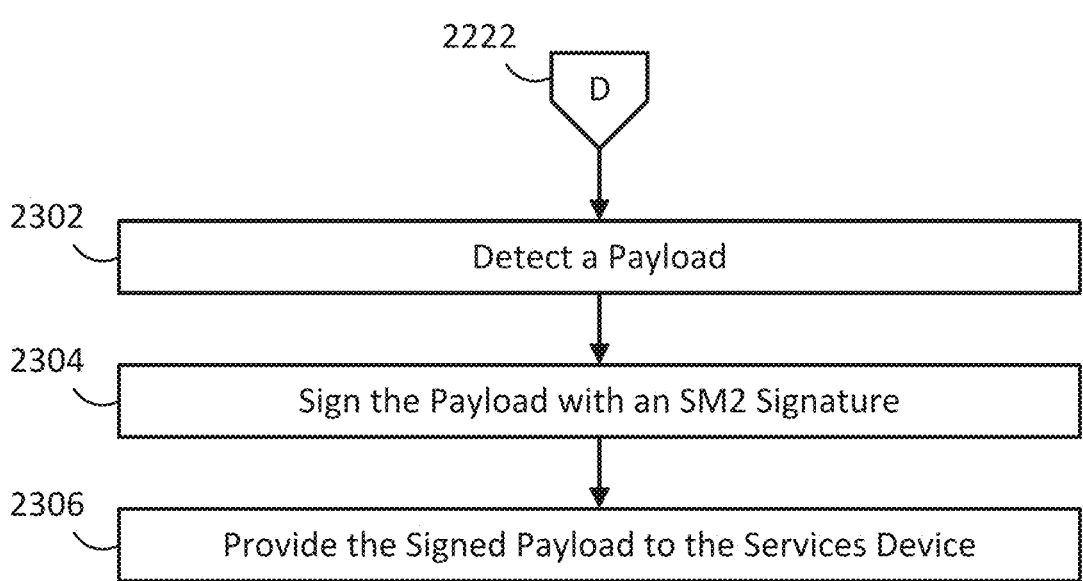
FIG. 23 illustrates a second portion of the example procedure of FIG. 22 for execution of a credential extension on a device to collect information in accordance with some embodiments.

FIG. 23 illustrates a second portion of the example procedure 2200 for execution of a credential extension on a device to collect information in accordance with some embodiments. The procedure 2200 may proceed from 2222 illustrated in FIGS. 22 to 2222 illustrated in FIG. 23.

In 2302, the device may detect a payload. For example, the credential extension executed on the device may detect a payload associated with the data transfer. The payload may include information collected for a step-authorization procedure in accordance with some of the approaches described throughout the disclosure. In some embodiments, 2302 may be omitted.

In 2304, the device may sign the payload with an SM2 signature. For example, the credential extension executed on the device may sign the payload detected in 2302 with an SM2 signature. In some embodiments, 2304 may be omitted.

In 2306, the device may provide the signed payload to the services device. For example, the credential extension executed on the device may provide the signed payload to the services device for authorization. In some embodiments, 2306 may be omitted.

FIG. 24 illustrates another example procedure 2400 for execution of a credential extension on a device to collect information in accordance with some embodiments. The procedure 2400 may be performed by a device, such as the device 102 (FIG. 1) and/or the device 200 (FIG. 2). The credential extension executed on the device may include one or more of the features of the credential extension 204 (FIG. 2) and/or the credential extension 1004 (FIG. 10). The order in which the operations of procedure 2400 (or any procedure described herein) are described is not intended to be construed as a limitation, and any number of the described operations can be combined in any order and/or in parallel to implement the described process(es).

In 2402, the device may detect an indication of information to be collected. For example, the device may detect indication of information to be collected by the credential extension. The indication may be received from a services device. The credential extension may be to collect the information based at least in part on the indication from the services device. In some embodiments, 2402 may be omitted.

In 2404, the device may detect an indication of security procedures. For example, the device may detect an indication of security procedures received from the services device for security of the information. In some embodiments, 2404 may be omitted.

In 2406, the device may detect a selection of a credential. For example, the device may detect a selection of a credential within a user information application execute by the device. The credential may be utilized for performance of the data transfer. A user of the device may select the credential from one or more credentials managed by the user information application.

In 2408, the device may execute the credential extension. For example, the device may execute the credential extension within the user information application to collect information of the data transfer. The credential extension may be sandboxed within the user information application, which may limit privileges of the credential extension to authorized operations within the user information application.

In 2410, the device may display a QR code. For example, the device may display a QR code based at least in part on the selection of the credential in 2406. The QR code may be scanned by a remote device to initiate the data transfer. Information collected by the credential extension may be related to the display of the QR code. In some embodiments, 2410 may be omitted.

In 2412, the device may collect information related to the data transfer. For example, the credential extension executed by the device may collect information related to the data transfer for authorization of the data transfer. In some embodiments, the information collected by the credential extension may be defined by the indication of the information to be collected detected in 2402.

In 2414, the device may generate a bundle. For example, the device may generate a bundle with the information collected by the credential extension through application of the security procedures indicated in 2404. The security procedures may cause the data within the bundle to be inaccessible by the user information application executed by the device. In some embodiments, 2414 may be omitted.

In 2416, the device may provide the information to the services device. For example, the credential extension executed by the device may provide the information collected by the credential extension to the service device corresponding to the credential.

FIG. 25 illustrates an example UE 2500 in accordance with some embodiments. The UE 2500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 2500 may be a RedCap UE or NR-Light UE.

The UE 2500 may include processors 2504, RF interface circuitry 2508, memory/storage 2512, user interface 2516, sensors 2520, driver circuitry 2522, power management integrated circuit (PMIC) 2524, antenna structure 2526, and battery 2528. The components of the UE 2500 may be implemented as integrated circuits (ICs), portions thereof, discrete electronic devices, or other modules, logic, hardware, software, firmware, or a combination thereof. The block diagram of FIG. 25 is intended to show a high-level view of some of the components of the UE 2500. However, some of the components shown may be omitted, additional components may be present, and different arrangement of the components shown may occur in other implementations.

The components of the UE 2500 may be coupled with various other components over one or more interconnects 2532, which may represent any type of interface, input/output, bus (local, system, or expansion), transmission line, trace, optical connection, etc. that allows various circuit components (on common or different chips or chipsets) to interact with one another.

The processors 2504 may include processor circuitry such as, for example, baseband processor circuitry (BB) 2504A, central processor unit circuitry (CPU) 2504B, and graphics processor unit circuitry (GPU) 2504C. The processors 2504 may include any type of circuitry or processor circuitry that executes or otherwise operates computer-executable instructions, such as program code, software modules, or functional processes from memory/storage 2512 to cause the UE 2500 to perform operations as described herein.

In some embodiments, the baseband processor circuitry 2504A may access a communication protocol stack 2536 in the memory/storage 2512 to communicate over a 3GPP compatible network. In general, the baseband processor circuitry 2504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 2508.

The baseband processor circuitry 2504A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 2512 may include one or more non-transitory, computer-readable media that includes instructions (for example, communication protocol stack 2536) that may be executed by one or more of the processors 2504 to cause the UE 2500 to perform various operations described herein. The memory/storage 2512 include any type of volatile or non-volatile memory that may be distributed throughout the UE 2500. In some embodiments, some of the memory/storage 2512 may be located on the processors 2504 themselves (for example, L1 and L2 cache), while other memory/storage 2512 is external to the processors 2504 but accessible thereto via a memory interface. The memory/storage 2512 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 2508 may include transceiver circuitry and radio frequency front module (RFEM) that allows the UE 2500 to communicate with other devices over a radio access network. The RF interface circuitry 2508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2526 and proceed to filter and amplify (with a low-noise amplifier) the signal. The signal may be provided to a receiver of the transceiver that down-converts the RF signal into a baseband signal that is provided to the baseband processor of the processors 2504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2526.

In various embodiments, the RF interface circuitry 2508 may be configured to transmit/receive signals in a manner compatible with NR access technologies.

The antenna 2526 may include antenna elements to convert electrical signals into radio waves to travel through the air and to convert received radio waves into electrical signals. The antenna elements may be arranged into one or more antenna panels. The antenna 2526 may have antenna panels that are omnidirectional, directional, or a combination thereof to enable beamforming and multiple input, multiple output communications. The antenna 2526 may include microstrip antennas, printed antennas fabricated on the surface of one or more printed circuit boards, patch antennas, phased array antennas, etc. The antenna 2526 may have one or more panels designed for specific frequency bands including bands in FR1 or FR2.

The user interface circuitry 2516 includes various input/output (I/O) devices designed to enable user interaction with the UE 2500. The user interface 2516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 2500.

The sensors 2520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2522 may include software and hardware elements that operate to control particular devices that are embedded in the UE 2500, attached to the UE 2500, or otherwise communicatively coupled with the UE 2500. The driver circuitry 2522 may include individual drivers allowing other components to interact with or control various input/output (I/O) devices that may be present within, or connected to, the UE 2500. For example, driver circuitry 2522 may include a display driver to control and allow access to a display device, a touchscreen driver to control and allow access to a touchscreen interface, sensor drivers to obtain sensor readings of sensor circuitry 2520 and control and allow access to sensor circuitry 2520, drivers to obtain actuator positions of electro-mechanic components or control and allow access to the electro-mechanic components, a camera driver to control and allow access to an embedded image capture device, audio drivers to control and allow access to one or more audio devices.

The PMIC 2524 may manage power provided to various components of the UE 2500. In particular, with respect to the processors 2504, the PMIC 2524 may control power-source selection, voltage scaling, battery charging, or DC-to-DC conversion.

In some embodiments, the PMIC 2524 may control, or otherwise be part of, various power saving mechanisms of the UE 2500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 2500 may power down for brief intervals of time and thus save power. If there is no data traffic activity for an extended period of time, then the UE 2500 may transition off to an RRC_Idle state, where it disconnects from the network and does not perform operations such as channel quality feedback, handover, etc. The UE 2500 goes into a very low power state and it performs paging where again it periodically wakes up to listen to the network and then powers down again. The UE 2500 may not receive data in this state; in order to receive data, it may need to transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2528 may power the UE 2500, although in some examples the UE 2500 may be mounted deployed in a fixed location, and may have a power supply coupled to an electrical grid. The battery 2528 may be a lithium ion battery, a metal-air battery, such as a zinc-air battery, an aluminum-air battery, a lithium-air battery, and the like. In some implementations, such as in vehicle-based applications, the battery 2528 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

As described above, one aspect of the present technology is the gathering, sharing, and use of data, including an authentication tag and data from which the tag is derived. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which device ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, users may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In some examples, "circuitry" can refer to, be part of, or include hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The specific details of particular embodiments may be combined in any suitable manner or varied from those shown and described herein without departing from the spirit and scope of embodiments of the described techniques.

The above description of exemplary embodiments of the described techniques has been presented for the purposes of illustration and description. It is not intended to be exhaustive or to limit the described techniques to the precise form described, and many modifications and variations are possible in light of the teaching above. The embodiments were chosen and described in order to best explain the principles of the described techniques and its practical applications to thereby enable others skilled in the art to best utilize the described techniques in various embodiments and with various modifications as are suited to the particular use contemplated.

All publications, patents, and patent applications cited herein are hereby incorporated by reference in their entirety for all purposes.

EXAMPLES

In the following sections, further exemplary embodiments are provided.

Example 1 may include one or more non-transitory computer-readable media having instructions that, when executed by one or more processors of a device, cause the device to receive a plurality of quick response (QR) codes associated with an account received from a quick response provision device, each of the plurality of quick response codes being individually encrypted such that a single quick response code of the plurality of quick response codes is configured to be decrypted at a time, receive a request to display a quick response code of the plurality of quick response codes, the display of the quick response code configured to enable initiation of a data transfer, perform an authorization operation for authorization for the account based at least in part on the request to display the quick response code, determine whether to decrypt the quick response code based at least in part on the authorization for the account, and determine whether to display the quick response code on a display of the device based at least in part on whether the quick response code is determined to be decrypted.

Example 2 may include the one or more non-transitory computer-readable media of example 1, wherein the instructions, when executed by the one or more processors, further cause the device to determine that the authorization is achieved for the account, decrypt the quick response code based at least in part on the authorization being achieved for the account, and display the quick response code on the display of the device, wherein a remote device is configured to scan the quick response code and to initiate the data transfer.

Example 3 may include the one or more non-transitory computer-readable media of example 2, wherein the instructions, when executed by the one or more processors, further cause the device to determine a first timestamp that indicates a first time that the quick response code is first displayed on the display of the device, and provide the first timestamp to a services device, wherein the services device is configured to compare the first timestamp with a second timestamp that indicates a second time that the quick response code is scanned to determine whether the quick response code has been used within an allowed time period.

Example 4 may include the one or more non-transitory computer-readable media of example 2, wherein the instructions, when executed by the one or more processors, further cause the device to receive an authorization request for a further authorization operation for the data transfer received from a services device, identify data for the further authorization operation, and provide the data for the further authorization operation to the services device, the data for the further authorization operation configured to be utilized for determining authority to complete the data transfer.

Example 5 may include the one or more non-transitory computer-readable media of example 2, wherein to decrypt the quick response code includes decrypting the quick response code with a key stored on a secure element of the device, and wherein the plurality of quick response codes are stored separate from the secure element.

Example 6 may include the one or more non-transitory computer-readable media of example 1, wherein the instructions, when executed by the one or more processors, further cause the device to determine that a number of quick response codes stored on the device is less than a threshold number of quick response codes, and request the plurality of quick response codes be provided by the quick response provision device, wherein the quick response provision device provides the plurality of quick response codes based at least in part on the plurality of quick response codes being requested.

Example 7 may include the one or more non-transitory computer-readable media of example 6, wherein the instructions, when executed by the one or more processors, further cause the device to indicate an amount of quick response codes to be included in the plurality of quick response codes provided by the quick response provision device.

Example 8 may include the one or more non-transitory computer-readable media of example 1, wherein the instructions, when executed by the one or more processors, further cause the device to determine that one or more quick response codes stored on the device have been stored for longer than a time threshold, remove the one or more quick response codes from the device based at least in part on the one or more quick response codes having been stored for longer than the time threshold, and request the plurality of quick response codes based at least in part on the one or more quick response codes having been stored for longer than the time threshold.

Example 9 may include the one or more non-transitory computer-readable media of example 1, wherein the instructions, when executed by the one or more processors, further cause the device to determine that one or more quick response codes of the plurality of quick response codes have been stored on the device longer than a time threshold, determine that the device does not have connectivity with the quick response provision device, and maintain storage of the one or more quick response codes at least until the device has connectivity with the quick response provision device based at least in part on the determination that the device does not have connectivity with the quick response provision device.

Example 10 may include a device, comprising memory to store a plurality of quick response (QR) codes associated with an account, quick response codes within the plurality of quick response codes being individually encrypted, and processing circuitry coupled to the memory, the processing circuitry to receive an authorization request to display a quick response code of the plurality of quick response codes, the display of the quick response code configured to enable initiation of a data transfer associated with the account, perform an authorization operation for authorization for the account, decrypt the quick response code based at least in part on the authorization being achieved for the account, the device limited to decryption of a single quick response code at a time based at least in part on the plurality of quick response codes being individually encrypted, and display the decrypted quick response code on a display of the device, the quick response code configured to be scanned by a remote device for initiation of the data transfer.

Example 11 may include the device of example 10, wherein the processing circuitry is further to determine a first timestamp that indicates a first time at which the decrypted quick response code is initially displayed on the display of the device, and provide the first timestamp to a services device associated with the plurality of quick response codes, the services device configured to compare the first timestamp with a second timestamp that indicates a second time that the quick response code is scanned to determine whether the quick response code has been used within an allowed time period.

Example 12 may include the device of example 10, wherein the processing circuitry is further to receive a request for a further authorization operation for the data transfer received from a services device associated with the plurality of quick response codes, identify data for the further authorization operation, and provide the data for the further authorization operation to the services device, the data for the further authorization operation configured to be utilized for determining authority to complete the data transfer.

Example 13 may include the device of example 10, wherein the processing circuitry is further to determine that a number of quick response codes stored in the memory is less than a threshold number of quick response codes, and provide a request to a quick response provision device associated with the plurality of quick response codes to provide additional quick response codes based at least in part on the number of quick response codes being less than the threshold number of quick response codes.

Example 14 may include the device of example 13, wherein the processing circuitry is further to indicate a number of the additional quick response codes to be provided by the quick response provision device.

Example 15 may include the device of example 10, wherein the processing circuitry is further to determine that a portion of the plurality of quick response codes have been stored for longer than a time threshold, and remove the portion of the plurality of quick response codes from the memory based at least in part on the determination that the portion of the plurality of quick response codes have been stored for longer than the time threshold.

Example 16 may include the device of example 10, wherein to decrypt the quick response code includes to decrypt the quick response code with a key stored on a secure element of the device, and wherein the plurality of quick response codes are stored separate from the secure element.

Example 17 may include a method for performing a data transfer, comprising receiving, by a device, a request to display a quick response (QR) code to be utilized for initiation of the data transfer, performing, by the device, an authorization operation for authorization to utilize the quick response code, decrypting, by the device, the quick response code from a plurality of quick response codes stored on the device based at least in part on the authorization operation, the device unable to decrypt other quick response codes from the plurality of quick response codes based at least in part on the authorization operation due to the plurality of quick response codes being individually encrypted, and displaying, by the device, the quick response code on a display of the device, the quick response code to be scanned to initiate the data transfer.

Example 18 may include the method of example 17, further comprising preventing the quick response code from being displayed a second time on the display of the device.

Example 19 may include the method of example 17, further comprising determining, by the device, that a number of valid quick response codes of the plurality of quick response codes stored on the device is less than a threshold number of quick response codes, and requesting, by the device, additional quick response codes from a quick response provision device based at least in part on the number of valid quick response codes being less than the threshold number of quick response codes.

Example 20 may include the method of example 17, further comprising determining, by the device, that one or more of the plurality of quick response codes has been stored on the device for longer than a time threshold, and removing, by the device, the one or more of the plurality of quick response codes from storage on the device based at least in part on the determining that the one or more of the plurality of quick response codes has been stored on the device for longer than the time threshold.

Example 21 may include one or more non-transitory computer-readable media having instruction that, when executed by one or more processors of a device, cause the device to detect a selection of a credential within a user information application, the credential to be utilized for performance of a data transfer, execute a credential extension within the user information application to collect information for authorization of the data transfer, the credential extension being sandboxed within the user information application, the sandboxing of the credential extension configured to limit privileges of the credential extension to authorized operations within the user information application, collect, by the credential extension, the information related to the data transfer for authorization of the data transfer, and provide, by the credential extension, the information to a services device corresponding to the credential for authorization of the data transfer.

Example 22 may include the one or more non-transitory computer-readable media of example 21, wherein the instructions, when executed by the one or more processors, further cause the device to detect an indication of the information to be collected by the credential extension received from the services device, wherein the credential extension is to collect the information based at least in part on the indication from the services device.

Example 23 may include the one or more non-transitory computer-readable media of example 21, wherein the instructions, when executed by the one or more processors, further cause the device to detect a user indication of acceptable information for collection during the data transfer, wherein the information collected by the credential extension is limited by the acceptable information.

Example 24 may include the one or more non-transitory computer-readable media of example 21, wherein the instructions, when executed by the one or more processors, further cause the device to detect an indication of security procedures received from the services device for security of the information, and generate, by the credential extension, a bundle with the information through application of the security procedures, the security procedures causing data within the bundle to be inaccessible by the user information application.

Example 25 may include the one or more non-transitory computer-readable media of example 24, wherein application of the security procedures includes encryption of the bundle.

Example 26 may include the one or more non-transitory computer-readable media of example 21, wherein the instructions, when executed by the one or more processors, further cause the device to display, on a display of the device, an indication that the credential extension is being executed to collect the information based at least in part on the execution of the credential extension.

Example 27 may include the one or more non-transitory computer-readable media of example 21, wherein the instructions, when executed by the one or more processors, further cause the device to display a quick response (QR) code, the quick response code to be scanned by a remote device to initiate the data transfer, wherein the information collected by the credential extension is related to the display of the quick response code.

Example 28 may include the one or more non-transitory computer-readable media of example 21, wherein the instructions, when executed by the one or more processors, further cause the device to detect, by the credential extension, a payload associated with the data transfer, sign, by the credential extension, the payload with an SM2 signature, and provide, by the credential extension, the signed payload to the services device for authorization.

Example 29 may include a device, comprising memory to store one or more credentials, and processing circuitry coupled to the memory, the processing circuitry to detect a selection of a credential, of the one or more credentials, within a user information application, the credential to be utilized for performance of a data transfer, execute a credential extension within the user information application to collect information for authorization of the data transfer, the credential extension being sandboxed within the user information application which limits privileges of the credential extension to authorized operations with the user information application, collect, by the credential extension, the information related to the data transfer for authorization of the data transfer, and provide, by the credential extension, the information to a services device corresponding to the credential for authorization of the data transfer.

Example 30 may include the device of example 29, wherein the processing circuitry is further to cause a quick response (QR) code to be displayed on a display of the device, the quick response code to be scanned by a remote device to initiate the data transfer, wherein the information collected by the credential extension is related to the display of the quick response code.

Example 31 may include the device of example 30, wherein the processing circuitry is further to prevent, by the credential extension, screenshots and screen recordings by the device while the quick response code is displayed.

Example 32 may include the device of example 29, wherein the processing circuitry is further to detect a user indication of acceptable information for collection during the data transfer, wherein the information collected by the credential extension is limited by the acceptable information.

Example 33 may include the device of example 29, wherein the processing circuitry is further to detect an indication of security procedures received from the services device for security of the information, and generate, by the credential extension, a bundle with the information through application of the security procedures, the security procedures causing data within the bundle to be inaccessible by the user information application.

Example 34 may include the device of example 33, wherein the application of the security procedures includes encryption of the bundle.

Example 35 may include the device of example 29, wherein the processing circuitry is further to detect an indication of the information to be collected by the credential extension received from the services device, wherein the credential extension is to collect the information based at least in part on the indication from the services device.

Example 36 may include the device of example 29, wherein the processing circuitry is further to detect, by the credential extension, a payload associated with the data transfer, sign, by the credential extension, the payload with an SM2 signature, and provide, by the credential extension, the signed payload to the services device for authorization.

Example 37 may include a method for authorization of a data transfer, comprising detecting, by a device, a selection of a credential within a user information application, the credential to be utilized for performance of the data transfer, executing, by the device, a credential extension within the user information application to collect information for authorization of the data transfer, the credential extension being sandboxed within the user information application which limits privileges of the credential extension to authorized operations within the user information application, collecting, by the credential extension, the information related to the data transfer for authorization of the data transfer, and providing, by the credential extension, the information to a services device corresponding to the credential.

Example 38 may include the method of example 37, further comprising detecting, by the device, an indication of the information to be collected by the credential extension received from the services device, wherein the credential extension is to collect the information based at least in part on the indication from the services device.

Example 39 may include the method of example 37, further comprising detecting, by the device, an indication of security procedures received from the services device for security of the information, and generating, by the device, a bundle with the information through application of the security procedures, the security procedures causing data within the bundle to be inaccessible by the user information application.

Example 40 may include the method of example 37, further comprising displaying, by the device, a quick response (QR) code based at least in part on the selection of the credential, the quick response code to be scanned by a remote device to initiate the data transfer, wherein the information collected by the credential extension is related to the display of the quick response code.

Example 41 may include a method, comprising receiving a first timestamp from a first device, the first timestamp corresponding to a first time where a quick response (QR) code was initially displayed on the first device, receiving a second timestamp from a second device, the second timestamp corresponding to a second time where the quick response (QR) code was scanned by the second device, determining whether a time difference between the first timestamp and the second timestamp is less than a threshold period of time, and determining whether to allow a data transfer to be performed based at least in part on whether the time difference is determined to be less than the threshold period of time, the quick response (QR) code being associated with the data transfer.

Example 42 may include the method of example 41, wherein the data transfer is determined to be prevented from being performed based at least in part on the determination that the time difference is greater than the threshold period of time.

Example 43 may include the method of example 41, wherein the data transfer is determined to be allowed to be performed based at least in part on the determination that the time difference is less than the threshold period of time.

Example 44 may include the method of example 41, further comprising determining that the quick response (QR) code has been invalidated, and determining whether the first device failed to retrieve additional quick response (QR) codes, and wherein the determination of whether to allow the data transfer to be performed is further based at least in part on whether the first device failed to retrieve additional codes.

Example 45 may include the method of example 44, wherein the data transfer is determined to be allowed to be performed based at least in part on the determination that the first device failed to retrieve additional quick response (QR) codes.

Example 46 may include the method of example 41, wherein the data transfer is determined to be allowed to be performed, and wherein the method further comprises identifying a value for the data transfer received from the first device or the second device, and facilitating the data transfer with the value for an account stored on the device based at least in part on the determination to allow the data transfer to be performed.

Example 47 may include the method of example 41, further comprising identifying a first value for the data transfer received from the first device, identifying a second value for the data transfer received from the second device, and comparing the first value to the second value to determine whether the first value is equal to the second value, and wherein the determination of whether to allow the data transfer to be performed is further based at least in part on whether the first value is equal to the second value.

Example 48 may include the method of example 41, further comprising identifying a request for additional quick response (QR) codes for use by the first device, generating one or more quick response (QR) codes for use by the first device based at least in part on the request for additional quick response (QR) codes, individually encrypting the one or more quick response (QR) codes, and providing the encrypted one or more quick response (QR) codes for use by the first device.

Example 49 may include the method of example 48, wherein the request for additional quick response (QR) codes indicates a number of additional quick response (QR) codes, and wherein the one or more quick response (QR) codes comprises a number of quick response (QR) codes equal to the number of additional quick response (QR) codes.

Example 50 may include a device, comprising memory to store one or more timestamps, and one or more processors coupled to the memory, the one or more processors to at least receive a first timestamp from a first device, the first timestamp corresponding to a first time where a quick response (QR) code was initially displayed on the first device, receive a second timestamp from a second device, the second timestamp corresponding to a second time where the quick response (QR) code was scanned by the second device, determine whether a time difference between the first timestamp and the second timestamp is less than a threshold period of time, and determine whether to allow a data transfer to be performed based at least in part on whether the time difference is determined to be less than the threshold period of time, the quick response (QR) code being associated with the data transfer.

Example 51 may include the device of example 50, wherein the data transfer is determined to be allowed to be performed based at least in part on the determination that the time difference is less than the threshold period of time.

Example 52 may include the device of example 50, wherein the data transfer is determined to be prevented from being performed based at least in part on the determination that the time difference is greater than the threshold period of time.

Example 53 may include the device of example 50, wherein the one or more processors are further to at least determine that the quick response (QR) code has been invalidated, and determine whether the first device failed to retrieve additional quick response (QR) codes, and wherein the determination of whether to allow the data transfer to be performed is further based at least in part on whether the first device failed to retrieve additional quick response (QR) codes.

Example 54 may include the device of example 53, wherein the data transfer is determined to be allowed to be performed based at least in part on the determination that the first device failed to retrieve additional quick response (QR) codes.

Example 55 may include the device of example 50, wherein the one or more processors are further to at least identify a request for additional quick response (QR) codes for use by the first device, generate one or more quick response (QR) codes for use by the first device based at least in part on the request for additional quick response (QR) codes, individually encrypt the one or more quick response (QR) codes, and provide the encrypted one or more quick response (QR) codes for use by the first device.

Example 56 may include the device of example 55, wherein the request for additional quick response (QR) codes indicates a number of additional quick response (QR) codes, and wherein the one or more quick response (QR)

codes comprises a number of quick response (QR) codes equal to the number of additional quick response (QR) codes.

Example 57 may include a method of operating a device, comprising at least receiving, by the device, a first timestamp from a first device, the first timestamp corresponding to a first time where a quick response (QR) code was initially displayed on the first device, receiving, by the device, a second timestamp from a second device, the second timestamp corresponding to a second time where the quick response (QR) code was scanned by the second device, determining, by the device, whether a time difference between the first timestamp and the second timestamp is less than a threshold period of time, and determining, by the device, whether to allow a data transfer to be performed based at least in part on whether the time difference is determined to be less than the threshold period of time, the quick response (QR) code being associated with the data transfer.

Example 58 may include the method of example 57, further comprising at least determining, by the device, that the quick response (QR) code has been invalidated, and determining, by the device, whether the first device failed to retrieve additional quick response (QR) codes, and wherein the determination of whether to allow the data transfer to be performed is further based at least in part on whether the first device failed to retrieve additional quick response (QR) codes.

Example 59 may include the method of example 58, wherein the data transfer is determined to be allowed to be performed based at least in part on the determination that the first device failed to retrieve additional quick response (QR) codes.

Example 60 may include the method of example 57, further comprising at least identifying, by the device, a request for additional quick response (QR) codes for use by the first device, generating, by the device, one or more quick response (QR) codes for use by the first device based at least in part on the request for additional quick response (QR) codes, individually encrypting, by the device, the one or more quick response (QR) codes, and providing, by the device, the encrypted one or more quick response (QR) codes for use by the first device.

Example 61 may include an apparatus comprising means to perform one or more elements of a method described in or related to any of examples 1-60, or any other method or process described herein.

Example 62 may include one or more non-transitory computer-readable media comprising instructions to cause an electronic device, upon execution of the instructions by one or more processors of the electronic device, to perform one or more elements described in or related to any of examples 1-60, or any other method or process described herein.

Example 63 may include an apparatus comprising logic, modules, or circuitry to perform one or more elements described in or related to any of examples 1-60, or any other method or process described herein.

Example 64 may include a method, technique, or process as described in or related to any of examples 1-60, or portions or parts thereof.

Example 65 may include an apparatus comprising: one or more processors and one or more computer-readable media comprising instructions that, when executed by the one or more processors, cause the one or more processors to perform the method, techniques, or process as described in or related to any of examples 1-60, or portions thereof.

Example 66 may include a signal as described in or related to any of examples 1-60, or portions or parts thereof.

Example 67 may include a datagram, information element, packet, frame, segment, PDU, or message as described in or related to any of examples 1-60, or portions or parts thereof, or otherwise described in the present disclosure.

Example 68 may include a signal encoded with data as described in or related to any of examples 1-60, or portions or parts thereof, or otherwise described in the present disclosure.

Example 69 may include a signal encoded with a datagram, IE, packet, frame, segment, PDU, or message as described in or related to any of examples 1-60, or portions or parts thereof, or otherwise described in the present disclosure.

Example 70 may include an electromagnetic signal carrying computer-readable instructions, wherein execution of the computer-readable instructions by one or more processors is to cause the one or more processors to perform the method, techniques, or process as described in or related to any of examples 1-60, or portions thereof.

Example 71 may include a computer program comprising instructions, wherein execution of the program by a processing element is to cause the processing element to carry out the method, techniques, or process as described in or related to any of examples 1-60, or portions thereof.

Example 72 may include a signal in a wireless network as shown and described herein.

Example 73 may include a method of communicating in a wireless network as shown and described herein.

Example 74 may include a system for providing wireless communication as shown and described herein.

Example 75 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a device to at least:

receive a first timestamp from a first device, the first timestamp corresponding to a first time where a quick response (QR) code was initially displayed on the first device;

receive a second timestamp from a second device, the second timestamp corresponding to a second time where the quick response (QR) code was scanned by the second device;

determine that a time difference between the first timestamp and the second timestamp is less than a threshold period of time;

determine that the quick response (QR) code has been invalidated;

determine that the first device failed to retrieve additional quick response (QR) codes;

determine whether to allow a data transfer to be performed based at least in part on whether the time difference is determined to be less than the threshold period of time and whether the first device failed to retrieve additional quick response (QR) codes, the quick response (QR) code being associated with the data transfer; and facilitate the data transfer based at least in part on the determination that the time difference is less than the threshold period of time and the determination that the first device failed to retrieve additional quick response (QR) codes.

2. The one or more non-transitory computer-readable media of claim 1, wherein the data transfer is determined to be allowed to be performed based at least in part on the determination that the time difference is less than the threshold period of time.

3. The one or more non-transitory computer-readable media of claim 1, wherein the data transfer is determined to be allowed to be performed based at least in part on the determination that the first device failed to retrieve additional quick response (QR) codes.

4. The one or more non-transitory computer-readable media of claim 1, wherein the data transfer is determined to be allowed to be performed, and wherein the instructions, when executed by the one or more processors, further cause the device to at least:

identify a value for the data transfer received from the first device or the second device, wherein the data transfer is facilitated with the value for an account stored on the device.

5. The one or more non-transitory computer-readable media of claim 1, wherein the instructions, when executed by the one or more processors further cause the device to at least:

identify a first value for the data transfer received from the first device;

identify a second value for the data transfer received from the second device; and compare the first value to the second value to determine whether the first value is equal to the second value, and wherein the determination of whether to allow the data transfer to be performed is further based at least in part on whether the first value is equal to the second value.

6. The one or more non-transitory computer-readable media of claim 1, wherein the instructions, when executed by the one or more processors further cause the device to at least:

identify a request for additional quick response (QR) codes for use by the first device;

generate one or more quick response (QR) codes for use by the first device based at least in part on the request for additional quick response (QR) codes;

individually encrypt the one or more quick response (QR) codes; and provide the encrypted one or more quick response (QR) codes for use by the first device.

7. The one or more non-transitory computer-readable media of claim 6, wherein the request for additional quick response (QR) codes indicates a number of additional quick response (QR) codes, and wherein the one or more quick response (QR) codes comprises a number of quick response (QR) codes equal to the number of additional quick response (QR) codes.

8. The one or more non-transitory computer-readable media of claim 1, wherein the threshold period of time is a first threshold period of time, and wherein the instructions, when executed by the one or more processors, further cause the device to:

determine that the quick response (QR) code has been stored on the first device longer than a second threshold period of time, wherein the quick response (QR) code is determined to be invalidated based at least in part on the determination that the quick response (QR) code has been stored on the first device longer than the second threshold period of time.

9. A device, comprising:

memory to store one or more timestamps; and one or more processors coupled to the memory, the one or more processors to at least:

receive a first timestamp from a first device, the first timestamp corresponding to a first time where a quick response (QR) code was initially displayed on the first device;

receive a second timestamp from a second device, the second timestamp corresponding to a second time where the quick response (QR) code was scanned by the second device;

determine that a time difference between the first timestamp and the second timestamp is less than a threshold period of time;

determine that the quick response (QR) code has been invalidated;

determine that the first device failed to retrieve additional quick response (QR) codes;

determine whether to allow a data transfer to be performed based at least in part on whether the time difference is determined to be less than the threshold period of time and whether the first device failed to retrieve additional quick response (QR) codes, the quick response (QR) code being associated with the data transfer; and facilitate the data transfer based at least in part on the determination that the time difference is less than the threshold period of time and the determination that the first device failed to retrieve additional quick response (QR) codes.

10. The device of claim 9, wherein the data transfer is determined to be allowed to be performed based at least in part on the determination that the time difference is less than the threshold period of time.

11. The device of claim 9, wherein the data transfer is determined to be allowed to be performed based at least in part on the determination that the first device failed to retrieve additional quick response (QR) codes.

12. The device of claim 9, wherein the one or more processors are further to at least:

identify a request for additional quick response (QR) codes for use by the first device;

generate one or more quick response (QR) codes for use by the first device based at least in part on the request for additional quick response (QR) codes;

individually encrypt the one or more quick response (QR) codes; and provide the encrypted one or more quick response (QR) codes for use by the first device.

13. The device of claim 12, wherein the request for additional quick response (QR) codes indicates a number of additional quick response (QR) codes, and wherein the one or more quick response (QR) codes comprises a number of quick response (QR) codes equal to the number of additional quick response (QR) codes.

14. A method of operating a device, comprising at least:

receiving, by the device, a first timestamp from a first device, the first timestamp corresponding to a first time where a quick response (QR) code was initially displayed on the first device;

receiving, by the device, a second timestamp from a second device, the second timestamp corresponding to a second time where the quick response (QR) code was scanned by the second device;

determining, by the device, that a time difference between the first timestamp and the second timestamp is less than a threshold period of time;

determining, by the device, that the quick response (QR) code has been invalidated;

determining, by the device, that the first device failed to retrieve additional quick response (QR) codes;

determining, by the device, whether to allow a data transfer to be performed based at least in part on whether the time difference is determined to be less than the threshold period of time and whether the first device failed to retrieve additional quick response (QR) codes, the quick response (QR) code being associated with the data transfer; and facilitating, by the device, the data transfer based at least in part on the determination that the time difference is less than the threshold period of time and the determination that the first device failed to retrieve additional quick response (QR) codes.

15. The method of claim 14, wherein the data transfer is determined to be allowed to be performed based at least in part on the determination that the first device failed to retrieve additional quick response (QR) codes.

16. The method of claim 14, further comprising at least:

identifying, by the device, a request for additional quick response (QR) codes for use by the first device;

generating, by the device, one or more quick response (QR) codes for use by the first device based at least in part on the request for additional quick response (QR) codes;

individually encrypting, by the device, the one or more quick response (QR) codes; and providing, by the device, the encrypted one or more quick response (QR) codes for use by the first device.

17. The method of claim 14, wherein the threshold period of time is a first threshold period of time, and wherein the method further comprises:

determining that the quick response (QR) code has been stored on the first device longer than a second threshold period of time, wherein the quick response (QR) code is determined to be invalidated based at least in part on the determination that the quick response (QR) code has been stored on the first device longer than the second threshold period of time.

* * * * *